United States Patent
Zhang et al.

(10) Patent No.: US 12,498,791 B2
(45) Date of Patent: Dec. 16, 2025

(54) METHOD, DEVICE, AND MEDIUM FOR CONTENT TRANSMISSION BASED ON GESTURE OPERATION

(71) Applicant: Huawei Technologies Co., Ltd., Shenzhen (CN)

(72) Inventors: Dapeng Zhang, Wuhan (CN); Chen Chen, Wuhan (CN); Guoqiang Liu, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 139 days.

(21) Appl. No.: 17/951,902

(22) Filed: Sep. 23, 2022

(65) Prior Publication Data

US 2023/0042460 A1 Feb. 9, 2023

Related U.S. Application Data

(63) Continuation of application No. PCT/CN2021/080794, filed on Mar. 15, 2021.

(30) Foreign Application Priority Data

Mar. 25, 2020 (CN) .......................... 202010219576.2

(51) Int. Cl.
*G06F 3/01* (2006.01)
*G06F 3/0346* (2013.01)
(Continued)

(52) U.S. Cl.
CPC ............ *G06F 3/017* (2013.01); *G06F 3/0346* (2013.01); *G06F 3/0488* (2013.01); *H04B 5/73* (2024.01)

(58) Field of Classification Search
CPC ...... G06F 3/017; G06F 3/0346; G06F 3/0488; G06F 8/60; G06F 1/1694; G06F 1/1698;
(Continued)

(56) References Cited

U.S. PATENT DOCUMENTS

2009/0323586 A1 12/2009 Hohl et al.
2010/0161522 A1* 6/2010 Tirpak .................... G06F 3/016
715/702

(Continued)

FOREIGN PATENT DOCUMENTS

CN 102149211 A 8/2011
CN 103905613 A 7/2014
(Continued)

OTHER PUBLICATIONS

European Publication (Year: 2014).*
(Continued)

*Primary Examiner* — David D Davis
(74) *Attorney, Agent, or Firm* — Slater Matsil, LLP

(57) ABSTRACT

A content transmission method is provided. The method may include: A first device determines that a distance between the first device and a second device is less than a distance threshold. The first device provides a user with a prompt that content transmission can be performed between the first device and the second device. The first device recognizes a gesture operation performed by the user on the first device, and determines transmission content and a transmission direction of the transmission content between the first device and the second device based on the recognized gesture operation. The first device receives the transmission content from the second device or sends the transmission content to the second device based on the determined transmission direction.

20 Claims, 9 Drawing Sheets

(51) Int. Cl.
*G06F 3/0488* (2022.01)
*H04B 5/73* (2024.01)

(58) Field of Classification Search
CPC ....... G06F 3/04883; G06F 9/453; H04B 5/73; H04M 1/72412; H04M 1/72454; H04W 4/80; H04W 4/023
See application file for complete search history.

(56) References Cited

U.S. PATENT DOCUMENTS

| | | | |
|---|---|---|---|
| 2011/0083111 A1 | 4/2011 | Forutanpour et al. | |
| 2011/0279373 A1* | 11/2011 | Yokoyama | G06F 1/1694 345/168 |
| 2012/0242800 A1* | 9/2012 | Ionescu | G06V 40/107 348/46 |
| 2013/0217334 A1* | 8/2013 | Yu | H04W 76/10 455/41.2 |
| 2014/0030982 A1 | 1/2014 | Cardona | |
| 2014/0320387 A1* | 10/2014 | Eriksson | G06F 3/017 345/156 |
| 2015/0160731 A1* | 6/2015 | Yun | G06F 1/163 715/740 |
| 2016/0291696 A1 | 10/2016 | Rider | |
| 2017/0245128 A1* | 8/2017 | Cronholm | H04W 8/005 |
| 2017/0325275 A1* | 11/2017 | Tönsgård | H04L 67/10 |

FOREIGN PATENT DOCUMENTS

| | | | | |
|---|---|---|---|---|
| CN | 106020659 A | 10/2016 | | |
| CN | 106293404 A | 1/2017 | | |
| CN | 108718439 A | 10/2018 | | |
| CN | 109144362 A | 1/2019 | | |
| CN | 110719584 A | 1/2020 | | |
| CN | 111522438 A | 8/2020 | | |
| EP | 2743823 A2 * | 6/2014 | ........... | G06F 3/1203 |
| EP | 3293955 A1 | 3/2018 | | |

OTHER PUBLICATIONS

HappyCode002, "Android gravity sensor obtains mobile phone movement direction and angle", https://www.cnblogs.com/happyxiaoyu02/archive/2012/10/10/6818973.html , Oct. 2012, 5 pages.

* cited by examiner

METHOD, DEVICE, AND MEDIUM FOR CONTENT TRANSMISSION BASED ON GESTURE OPERATION

CROSS-REFERENCE TO RELATED APPLICATIONS

This application is a continuation of International Application No. PCT/CN2021/080794, filed on Mar. 15, 2021, which claims priority to Chinese Patent Application No. 202010219576.2, filed on Mar. 25, 2020. The disclosures of the aforementioned applications are hereby incorporated by reference in their entireties.

TECHNICAL FIELD

This application relates to a content transmission method, a device, and a medium.

BACKGROUND

With popularization of terminal devices, each user may have a plurality of terminal devices (for example, a mobile phone, a tablet computer, and a desktop computer). Content synchronization and transmission between the terminal devices are increasingly frequent, and simplicity and convenience of a transmission manner greatly affect work and life efficiency of the user.

Currently, there are mainly two manners of data transmission between terminal devices. One is short-distance transmission, for example, using a universal serial bus (USB), Wi-Fi, Bluetooth, near field communication (NFC), or the like as a direct transmission channel. The other is network transmission that completes data transmission between terminal devices by using local area network transmission software, Internet social software, or the like. Various transmission manners need the user to perform cumbersome operations.

SUMMARY

An objective of this application is to provide a simple and easy-to-use content transmission solution.

A first aspect of this application provides a content transmission method. The method may include: A first device determines that a distance between the first device and a second device is less than a distance threshold. The first device provides a user with a prompt that content transmission can be performed between the first device and the second device. The first device recognizes a gesture operation performed by the user on the first device, and determines transmission content and a transmission direction of the transmission content between the first device and the second device based on the recognized gesture operation. The first device receives the transmission content from the second device or sends the transmission content to the second device based on the determined transmission direction.

According to the content transmission method provided in embodiments of this application, data transmission operations can be simplified, and incorrect determining for a data transmission direction can be avoided.

Further, that the first device determines transmission content and a transmission direction of the transmission content between the first device and the second device based on the recognized gesture operation may include: The first device determines, based on a recognized first gesture operation, first transmission content and that a transmission direction of the first transmission content is from the first device to the second device.

Alternatively, that the first device determines transmission content and a transmission direction of the transmission content between the first device and the second device based on the recognized gesture operation may include: The first device determines, based on a recognized second gesture operation, second transmission content and that a transmission direction of the second transmission content is from the second device to the first device.

Different gestures are used to correspond to different transmission directions, to avoid a problem that content shared between the first device and the second device is incorrect due to incorrect determining for the transmission direction. For example, the user originally expects to transmit data from the second device to the first device, but data of the first device is transmitted to the second device.

Further, the gesture operation may be a movement manner in which the user holds the first device. For example, the user holds the first device to move leftward, move rightward, move forward, move backward, or the like. The movement manner in which the user holds the first device may be obtained by detecting a change in acceleration of the first device, and the change in the acceleration may be detected by using a component such as a gravity sensor in the device.

Further, the gesture operation may be a touch operation performed by the user on a touchscreen of the first device, for example, an operation such as left sliding, right sliding, or touching and holding performed by the user on the touchscreen of the device.

Further, that a first device determines that a distance between the first device and a second device is less than a distance threshold may include: The first device monitors a change in magnetic induction signal strength of the first device, and when the change in the magnetic induction signal strength exceeds a preset strength change threshold, determines that the distance between the first device and the second device is less than the distance threshold. In this implementation, the magnetic induction signal strength is used as a trigger signal, and the distance measurement is triggered by using the change in the magnetic induction signal strength.

Further, that the first device determines the distance between the first device and the second device may include: The first device determines the distance between the first device and the second device through at least one of Bluetooth distance measurement, millimeter-wave distance measurement, and ultrasonic distance measurement.

Further, that the first device determines the distance between the first device and the second device through Bluetooth distance measurement may specifically include: The first device sends a first Bluetooth broadcast signal. The first device receives a second Bluetooth broadcast signal and information related to a second distance that are sent by the second device, where the second Bluetooth broadcast signal is sent by the second device in response to the received first Bluetooth broadcast signal, the information related to the second distance is used to represent the second distance, and the second distance is a second distance between the first device and the second device that is calculated by the second device based on the received first Bluetooth broadcast signal. The first device obtains a first distance based on the received second Bluetooth broadcast signal, where the first distance is a first distance between the first device and the second device that is calculated by the first device based on signal strength of the second Bluetooth broadcast signal. A larger one of the first distance and the second distance is determined as the distance between the first device and the second device.

According to the content transmission method provided in implementations provided in the first aspect of this application, a data transmission process can be simplified. In addition, a transmission direction and transmission content are determined through gesture recognition, so that bidirectional transmission between two devices is implemented, and an error in a transmission direction can be effectively avoided.

A second aspect of this application provides a content transmission apparatus. The apparatus has a function of implementing the method provided in any one of the first aspect or the implementations of the first aspect. The function may be implemented by hardware, or may be implemented by hardware executing corresponding software. The hardware or the software includes one or more modules corresponding to the foregoing function.

A third aspect of this application provides a machine-readable medium. The machine-readable medium may store instructions. When the instructions are run by a machine, the machine may perform the method provided in any one of the first aspect or the implementations of the first aspect.

A fourth aspect of this application provides a device, including a memory and a processor. The memory stores instructions, and the processor is configured to read and execute the instructions in the memory, so that the device performs the following operations. The device determines that a distance between the device and a second device is less than a distance threshold. The device prompts a user to perform a gesture operation on the device to transmit content, where the device can recognize at least two gesture operations performed by the user on the device, and perform content transmission with the second device. The device recognizes the gesture operation performed by the user on the device, and the device determines transmission content and a transmission direction of the transmission content between the device and the second device based on the recognized gesture operation. The device receives the transmission content from the second device or sends the transmission content to the second device based on the determined transmission direction.

A fifth aspect of this application provides a system. The system may include the device and the second device that are provided in any one of the fourth aspect or the implementations of the fourth aspect.

A sixth aspect of this application provides a computer program product. The computer program product may include program code. When the computer program product is executed by a controller, the controller performs the method provided in any one of the first aspect or the implementations of the first aspect. The computer program product may be a software installation package. When the method provided in any one of the first aspect or the implementations of the first aspect needs to be used, the computer program product may be downloaded to the controller, and the computer program product runs on the controller.

According to the content sharing solution provided in various implementations of this application, a data transmission process is simplified. In addition, a transmission direction and transmission content are determined through gesture recognition, so that bidirectional transmission between two devices is implemented, and an error in a transmission direction can be effectively avoided. In addition, compared with a case in which a manner such as NFC contact can be applied only to a short transmission distance, the solutions provided in this application can be applied to a longer distance.

DETAILED DESCRIPTION OF ILLUSTRATIVE EMBODIMENTS

Figure 1:
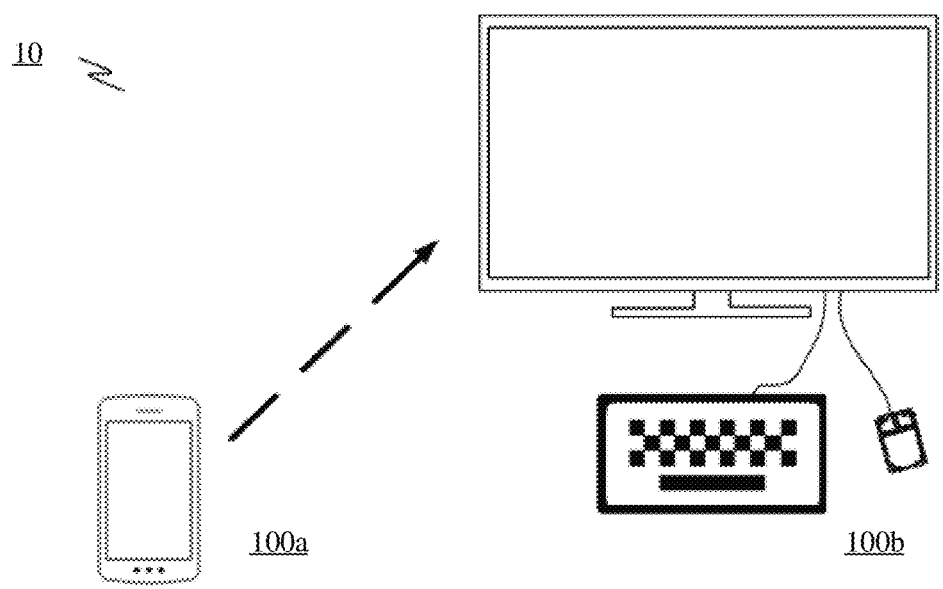
FIG. 1 shows an example of a scenario in which short-distance content transmission is performed between terminal devices.

The following further describes this application with reference to specific embodiments and the accompanying drawings. It may be understood that the specific embodiments described herein are merely intended to explain this application, but not to limit this application. In addition, for ease of description, the accompanying drawings show only some but not all structures or processes related to this application. It should be noted that in this specification, similar reference numerals and letters represent similar items in the following figures.

The illustrative embodiments of this application include but are not limited to a content transmission method, a device, a medium, and the like.

To make the objectives, technical solutions, and advantages of this application clearer, the following further describes the implementations of this application in detail with reference to the accompanying drawings. In the accompanying drawings, a letter following a reference numeral, for example, "100a", represents a reference to an element having the specified reference numeral. In the text, a reference numeral that is not followed by a letter, for example, "100", represents a general reference to an implementation of an element having the reference numeral.

Currently, in an existing transmission technology, in data transmission manners between terminal devices, a user needs to perform cumbersome operations of a plurality of steps. For example, if a first terminal device needs to share content with a second terminal device, the user usually needs to perform a plurality of operations on the first terminal device, for example, selecting transmission content, searching for, discovering, and selecting a target device, clicking "Share", and then completing transmission. The sharing process is cumbersome. There are some manners in which a plurality of steps are simplified into one-step sharing (for example, data is shared in one step by using NFC contact, a sound, an ultrasonic wave, or a shortcut key). However, these manners easily cause incorrect determining for a data sharing direction. For example, the user originally expects to transmit data from the first terminal device to the second terminal device, but due to an accidental touch or a misoperation, data of the second terminal device may be transmitted to the first terminal device, affecting user experience.

Embodiments of this application intended to provide a solution for sharing content based on a distance and a gesture, so as to avoid incorrect determining for a data transmission direction and simplify sharing operations. The content sharing method provided in embodiments of this application is applicable to content sharing between terminal devices, for example, content synchronization and transmission between two terminal devices.

FIG. 1 shows an example of a scenario in which short-distance content sharing is performed between terminal devices.

As shown in FIG. 1, according to some embodiments of this application, a data sharing system 10 is provided. The data sharing system 10 may include two terminal devices 100, for example, a mobile phone 100a and a computer 100b. A user may hold the mobile phone 100a to approach the computer 100b, to implement short-distance content sharing.

In the data sharing system 10 shown in FIG. 1, the mobile phone 100a may include a magnetic sensor, and the computer 100b may include a large quantity of magnetic components. In a stable state in which no magnetic component or device exists around the mobile phone 100a, magnetic induction signal strength sensed by the mobile phone 100a by using the magnetic sensor is also stable. However, when the mobile phone 100a approaches the computer 100b, the magnetic sensor of the mobile phone 100a is affected by the magnetic component of the computer 100b. As a result, a sharp fluctuation occurs on the magnetic induction signal strength of the mobile phone 100a. Therefore, a case that the mobile phone 100a detects that a change in the magnetic induction signal strength exceeds a specific strength change threshold may be used as a trigger condition. Then, the two terminal devices 100 may verify, by using Bluetooth broadcast, an ultrasonic wave, or the like, whether a distance between the two terminal devices 100 is close enough, trigger transmission when the distance between the two terminal devices is within a preset range, and then determine a transmission direction of data between the mobile phone 100a and the computer 100b based on a user gesture, to implement content sharing between the two terminal devices. Embodiments of this application intended to accurately identify a distance between devices by using a magnetic sensor, Bluetooth, an ultrasonic capability, or the like in a terminal device in combination with a user gesture, to implement convenient and accurate content sharing between two terminal devices.

According to some embodiments of this application, the terminal devices 100 are not limited to the mobile phone 100a and the computer 100b shown in FIG. 1, and may be various computing devices each including memory and a hardware processor. For example, examples of the terminal device 100 may include various electronic devices such as a mobile phone, a camera, a tablet computer, a desktop computer, a laptop computer, a vehicle-mounted terminal, a smart voice terminal, a portable game console, a portable music player, a reader device, a wearable device, a smart home device, an augmented reality (AR) device, and a virtual reality (VR) device. An example embodiment of the terminal device 100 includes but is not limited to various electronic devices using iOS, Android, Microsoft, or another operating system.

In some implementations, the terminal device 100 may be a wearable device worn by a user. For example, the terminal device 100 may be a watch, a band, jewelry, glasses, or the like, or may be used as a part of a watch, a band, jewelry, glasses, or the like. In various implementations, a user may view a message on a display of the terminal device 100, or may access a message by using a loudspeaker or another output device of the device. In another example, a user may access a message by using a headset coupled to the terminal device 100 or as a part of the terminal device 100, a loudspeaker of the terminal device 100, a tactile feedback element of the terminal device 100, or the like.

The terminal device 100 may interact with another device through a network. In various implementations, the network may be a wired network or a wireless network, and may have many different configurations. The network may include various interconnected data paths such as a local area network (LAN) and a wide area network (WAN) (for example, the Internet). The network may be further coupled to or include a part of a telecommunications network for sending data by using various different communications protocols. In some implementations, the network may include a Bluetooth communications network, Wi-Fi, a cellular communications network, or the like for sending and receiving data.

A specific example of a structure of the terminal device 100 is specifically described below with reference to FIG. 5 to FIG. 8.

With reference to FIG. 2A and FIG. 2B and FIG. 4A and FIG. 4B, the following describes in detail a process of sharing content between the terminal devices 100 by using the mobile phone 100a and the computer 100b in FIG. 1 as an example.

Figure 2A:
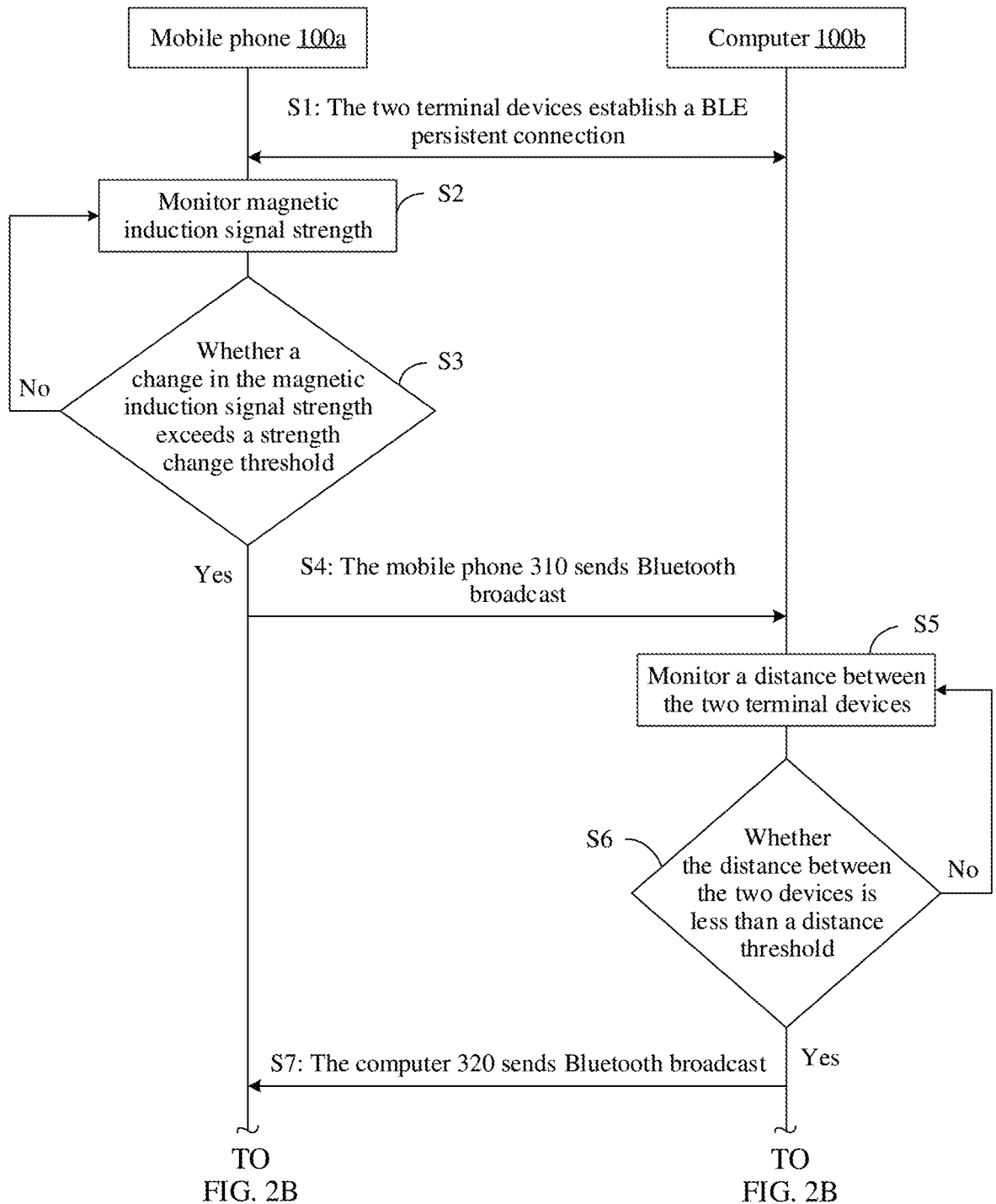
FIG. 2A and FIG. 2B are a flowchart of an interaction process of sharing content between a mobile phone and a computer according to an embodiment of this application.
Figure 2B:
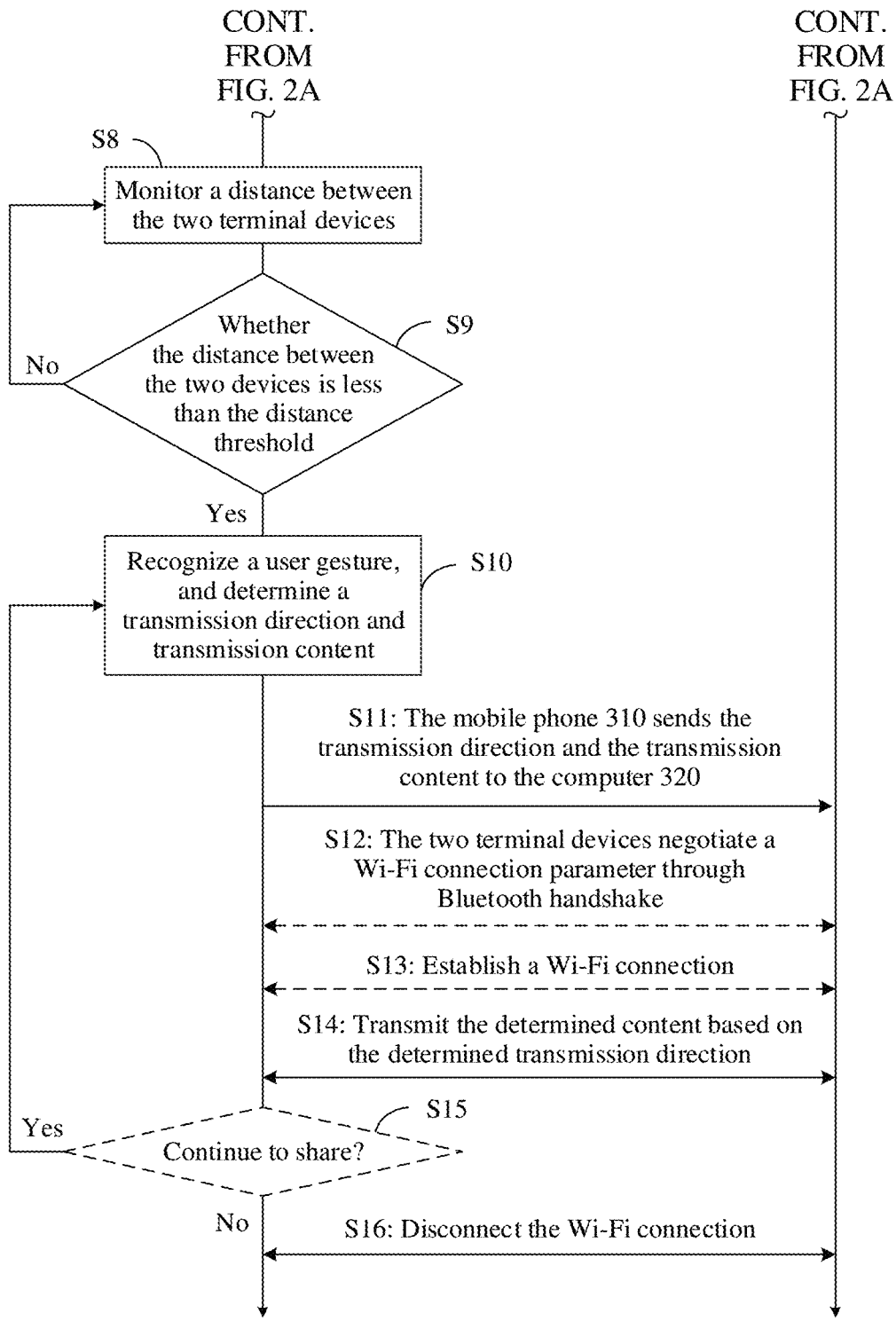

According to an embodiment of this application, FIG. 2A and FIG. 2B show an interaction process of sharing content between the mobile phone 100a and the computer 100b.

S1: The mobile phone 100a and the computer 100b approach each other, identify each other by using Bluetooth, and perform Bluetooth pairing to establish a persistent connection, for example, establish a Bluetooth low energy (BLE) persistent connection. In some implementations, the mobile phone and the computer may be communicatively coupled by using a wireless communications module 160 shown in FIG. 5 or another similar module, to establish a BLE persistent connection.

S2: After the connection is established, the two terminal devices first trigger a data transmission intent, and the mobile phone 100a monitors a change in magnetic induction signal strength of the mobile phone 100a in real time by using an internal magnetic sensor.

In this embodiment of the present invention, a feature that the magnetic sensor in the mobile phone 100a can detect magnetic field strength in a current environment is used. When a magnetic interference source approaches, the magnetic sensor can recognize that an abnormal change occurs on data of the current magnetic field strength. A device such as the computer is a complex magnetic field. There are a large quantity of magnetic components in the computer 100b. When the computer 100b approaches the mobile phone 100a, the computer 100b may definitely become a magnetic interference source. In this application, the magnetic sensor in the mobile phone 100a detects a magnetic interference source to identify whether a device approaches the mobile phone 100a. When no magnetic interference source approaches the mobile phone 100a, magnetic induction signal strength detected by the mobile phone 100a is relatively stable. However, when the computer 100b approaches the mobile phone 100a, a sharp change or fluctuation occurs on the magnetic induction signal strength detected by the mobile phone 100a. Intensity of the change or fluctuation may be determined by detecting whether the change in the magnetic induction signal strength exceeds a preset strength change threshold, to identify whether a magnetic interference source approaches.

S3: When the computer 100b approaches the mobile phone 100a, the magnetic sensor of the mobile phone 100a monitors a sharp change in the magnetic induction signal strength, and the sharp change in the magnetic induction signal strength may be used as a trigger event for intending to share content between the mobile phone 100a and the computer 100b.

S4: When the mobile phone 100a detects that the change in the magnetic induction signal strength exceeds the preset strength change threshold (that is, a determining result in S3 is yes), it indicates that a sharp change occurs on the magnetic induction signal strength monitored by the mobile phone 100a. This means that a magnetic interference source appears near the mobile phone 100a. However, magnetic interference monitored by the mobile phone 100a does not necessarily mean that another terminal device such as the computer 100b is approaching. The magnetic interference source may be the computer 100b, or may be another device or component, for example, a magnet. For a purpose of verifying whether the magnetic interference source approaching the mobile phone 100a is the computer 100b that is persistently connected to the mobile phone 100a or another magnetic interference source, the mobile phone 100a may enable a Bluetooth broadcast signal, to measure a distance between the mobile phone 100a and the computer 100b by using Bluetooth.

S5 and S6: A Bluetooth persistent connection has been established between the mobile phone 100a and the computer 100b before, and the computer 100b may receive a Bluetooth signal sent by the mobile phone 100a, determine a distance between the computer 100b and the mobile phone 100a based on strength of the received Bluetooth signal, compare the determined distance with a preset threshold, and determine whether the distance between the computer 100b and the mobile phone 100a is less than the preset distance threshold.

The computer 100b may calculate a distance D between the computer 100b and the mobile phone 100a based on a Bluetooth received signal strength indicator (RSSI), as shown in the following Formula (1):

$$D=10^{((abs(RSSI)-A)/(10*n))} \quad (1)$$

In the formula:
D is a distance between a transmit end (that is, the mobile phone 100a) and a receive end (that is, the computer 100b);
RSSI indicates received signal strength (which is a negative value);
A is signal strength obtained when the transmit end (that is, the mobile phone 100a) and the receive end (that is, the computer 100b) are separated by 1 meter; and
n is an environment attenuation factor.

S7: For a purpose of improving accuracy of distance measurement, distance verification may be enabled on both the mobile phone 100a and the computer 100b. To be specific, after receiving the Bluetooth signal from the mobile phone 100a, the computer 100b also enables Bluetooth broadcast.

S8 and S9: For the mobile phone 100a, the mobile phone 100a may also determine a distance between the mobile phone 100a and the computer 100b based on strength of a received Bluetooth signal from the computer 100b, and determine whether the distance between the mobile phone 100a and the computer 100b is less than the preset distance threshold.

In this way, accuracy of distance monitoring can be further improved through double verification performed by the two terminal devices: the mobile phone 100a and the computer 100b. When both the mobile phone 100a and the computer 100b determine that the distance between the mobile phone 100a and the computer 100b is less than the preset distance threshold, it indicates that an event of the sharp change in the magnetic induction signal strength on the mobile phone 100a is not accidentally triggered by another magnetic interference source, but is indeed a magnetic interference event caused by approaching of the mobile phone 100a and the computer 100b.

In this embodiment of the present invention, after magnetic induction triggers a content sharing event, further verification is performed by determining the distance between the terminal devices, so that security of subsequent content transmission can be improved. Otherwise, if there is no distance determining operation, when the mobile phone 100a is far away from the computer 100b, because various magnetic components such as a magnet near the mobile phone 100a may cause a sharp change in the magnetic induction signal strength on the mobile phone 100a, triggering content transmission, there is a risk of data leakage.

According to some embodiments of this application, a magnetic induction trigger event may be verified through only single-ended distance measurement instead of double verification of the two terminal devices: the mobile phone 100a and the computer 100b. In addition, when a Bluetooth module complying with the Bluetooth 5.1 standard is installed on the mobile phone 100a or the computer 100b, high accuracy can be achieved through single-ended distance measurement. In this case, double verification at the two ends does not need to be performed.

In addition, according to some embodiments of this application, the distance between the mobile phone 100a and the computer 100b may alternatively be measured by using another solution, or may be measured by using a combination of a plurality of distance measurement solutions. The another distance measurement solution may include but is not limited to millimeter-wave distance measurement, ultrasonic distance measurement, or the like.

When it is determined that the distance between the mobile phone 100a and the computer 100b is less than the preset distance threshold, it may be determined that a content sharing condition is met between the mobile phone 100a and the computer 100b.

According to some embodiments of this application, after it is determined, by using the distance verification operation in S4 to S9, that the content sharing condition is met between the mobile phone 100a and the computer 100b, the mobile phone 100a may output a specific pattern, sound effect, vibration, dynamic interface effect, or the like, to prompt a user that a gesture operation may be started to share content.

S10: The mobile phone 100a recognizes the user gesture, and determines to-be-transmitted content and a transmission direction based on the user gesture.

According to some embodiments of this application, the user gesture may be a movement of the mobile phone 100a held by the user. In this case, the user gesture may be determined by monitoring a movement manner (for example, moving leftward or moving rightward) of the mobile phone 100a, and each gesture may be mapped to a specific operation to be started.

The movement manner (for example, moving leftward or moving rightward) of the mobile phone 100a may be obtained by detecting a change in acceleration of the mobile phone 100a by using a gravity sensor in the mobile phone 100a.

The gravity sensor is also referred to as a gravity inductor, and can sense a magnitude of acceleration of the mobile phone 100a in each direction, and further determine a motion of the mobile phone 100a by using an acceleration value, for example, shaking left and right, rising, or falling. When the mobile phone 100a is still, the gravity sensor may detect a magnitude and a direction of gravity. The gravity sensor in the mobile phone 100a is usually of a structure with three axes. The gravity sensor may sense acceleration in any direction by using the three axes, and determine a spatial motion of the mobile phone 100a.

Figure 3:
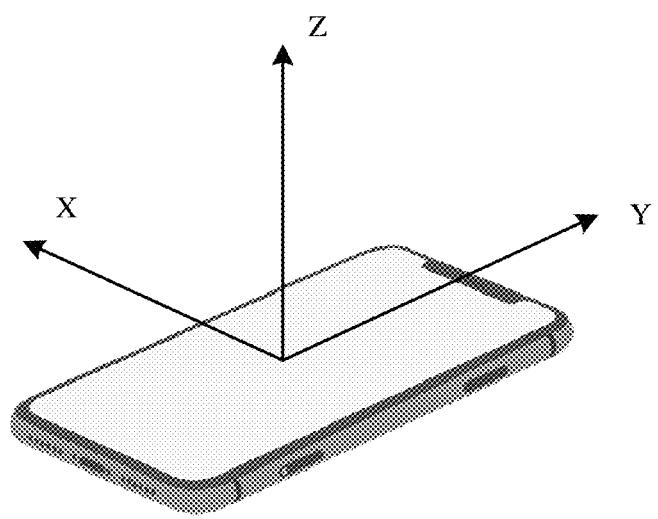
FIG. 3 is a schematic diagram of coordinates of a gravity sensor in a mobile phone according to an embodiment of this application.

When the gravity sensor calculates acceleration on the three axes, gravity sensing coordinates are usually described relative to the mobile phone 100a instead of spatial coordinates. For example, as shown in FIG. 3, the mobile phone is horizontally placed on a table with the front side facing upward, and the gravity sensor can sense acceleration values of the mobile phone 100a on three axes X, Y, and Z shown in the figure. The X axis is in a left-right direction, the Y axis is in a forward-backward direction, and the Z axis is in an up-down direction. Acceleration values on the three axes measured by the gravity sensor include impact of gravity, and a unit is m/s^2. In a static state, acceleration on the X axis is 0 by default, acceleration on the Y axis is 0 by default, and acceleration on the Z axis is 9.81 by default.

In the X-axis direction, if the mobile phone 100a suddenly moves leftward, an acceleration value on the X axis is a positive value, and if the mobile phone suddenly moves rightward, an acceleration value on the X axis is a negative value.

In the Y-axis direction, if the mobile phone 100a suddenly moves forward, an acceleration value on the Y axis is a positive value, and if the mobile phone suddenly moves backward, an acceleration value on the Y axis is a negative value.

In the Z-axis direction, if the mobile phone 100a suddenly moves to upward, an acceleration value on the Z axis is greater than 9.81, and if the mobile phone suddenly moves downward, an acceleration value on the Z axis is less than 9.81.

Therefore, after the gravity sensor is enabled, when the user performs no gesture, an acceleration signal measured by the gravity sensor is relatively stable; when the user performs a gesture, a sharp change occurs on the acceleration signal, and intensity of the signal change may be indicated by a difference value of the acceleration signal; and when the gesture is finished, the acceleration signal restores to a stable state. Therefore, a start point and an end point of movement of the mobile phone 100a and a specific movement direction of the mobile phone 100a may be determined in real time by using the acceleration difference value. A detailed process is as follows:

First, acceleration data measured by the gravity sensor is sampled. For the $k^{th}$ sampling point, an acceleration difference value on the three axes may be calculated by using Formula (2):

$$\Delta a_k = (ax_k - ax_{k-1}) + (ay_k - ay_{k-1}) + (az_k - az_{k-1}) \quad (2)$$

In the formula:

$\Delta a_k$ represents the acceleration difference value of the $k^{th}$ sampling point on the three axes;
$ax_k$ represents acceleration of the $k^{th}$ sampling point on the X axis;
$ax_{k-1}$ represents acceleration of the $(k-1)^{th}$ sampling point on the X axis;
$ay_k$ represents acceleration of the $k^{th}$ sampling point on the Y axis;
$ay_{k-1}$ represents acceleration of the $(k-1)^{th}$ sampling point on the Y axis;
$az_k$ represents acceleration of the $k^{th}$ sampling point on the Z axis; and
$az_{k-1}$ represents acceleration of the $(k-1)^{th}$ sampling point on the Z axis.

Subsequently, an average value of acceleration difference values within a time period before the point k may be obtained based on an acceleration difference value $\Delta a_k$ of each point on the three axes, for example, an average value $Ma_k$ of acceleration difference values of N sampling points (that is, N sampling points from the point k-N to the point k) before the point k.

$$Ma_k = \frac{1}{N} \sum_{i=k-N}^{k} \Delta a_i \quad (3)$$

In the formula:

$\Delta a_i$ represents an acceleration difference value of the $i^{th}$ sampling point in the N sampling points from the point k-N to the point k on the three axes; and
$Ma_k$ represents the average value of the acceleration difference values of the N sampling points before the point k.

In this case, a start point and an end point of the gesture may be determined by comparing $Ma_k$ with $\Delta a_k$. If $Ma_k << \Delta a_k$, it may be considered that the point k is the start point of the gesture; or if $Ma_k >> \Delta a_k$, it may be considered that the point k is the end point of the gesture.

A reason is as follows: When the user performs no gesture operation, the mobile phone 100a is in a relatively stable state, a difference between $\Delta a_k$ of the sampling points is small, and a smooth curve is formed if values of $\Delta a_k$ of the sampling points are connected. When the user performs a gesture operation, the mobile phone is suddenly accelerated, and a value of $\Delta a_k$ of the start point of the gesture operation increases sharply. In this case, $Ma_k << \Delta a_k$. On the contrary, when the gesture operation is finished, the mobile phone returns to a relatively stable state. In this case, $Ma_k >> \Delta a_k$. Therefore, the start point and the end point of the gesture can be relatively easily determined by comparing $Ma_k$ with $\Delta a_k$.

After the start point and the end point of the gesture are determined, duration of the gesture may be determined, and then average energy $E_{ax}$, $E_{ay}$, $E_{az}$ within the duration of the gesture in the X-axis direction, the Y-axis direction, and the Z-axis direction may be obtained:

$$\begin{cases} E_{ax} = \frac{1}{L} \sum_{j=1}^{L} ax_j^2 \\ E_{ay} = \frac{1}{L} \sum_{j=1}^{L} ay_j^2 \\ E_{az} = \frac{1}{L} \sum_{j=1}^{L} az_j^2 \end{cases}$$

In the formula above:

L is a quantity of sampling points from the start point to the end point of the gesture;

$ax_j$ is an acceleration value of the $j^{th}$ sampling point on the X axis in the time period from the start point to the end point of the gesture;

$ay_j$ is an acceleration value of the $j^{th}$ sampling point on the Y axis in the time period from the start point to the end point of the gesture;

$az_j$ is an acceleration value of the $j^{th}$ sampling point on the Z axis in the time period from the start point to the end point of the gesture;

$E_{ax}$ is an average energy value of the acceleration signal on the X axis in the time period from the start point to the end point of the gesture;

$E_{ay}$ is an average energy value of the acceleration signal on the Y axis in the time period from the start point to the end point of the gesture; and $E_{az}$ is an average energy value of the acceleration signal on the Z axis in the time period from the start point to the end point of the gesture.

The average energy values $E_{ax}$, $E_{ay}$, $E_{az}$ of the acceleration signal on the three axes X, Y, and Z are compared, to find an axis with a maximum energy value as a maximum-energy axis. If the maximum-energy axis is the X axis, it indicates that a left-right shake occurs on the mobile phone. If the maximum-energy axis is the Y axis, it indicates that a forward-backward shake occurs on the mobile phone. If the maximum-energy axis is the Z axis, it indicates that an up-down shake occurs on the mobile phone.

For example, the X axis is the maximum-energy axis. An upper threshold and a lower threshold of the acceleration of the mobile phone 100a in the X-axis direction are preset by using acceleration values ax of the L sampling points from the start point to the end point of the gesture, and whether the mobile phone moves leftward or rightward is determined based on whether the acceleration value first exceeds the upper threshold or the lower threshold. If the acceleration value first exceeds the upper threshold, it indicates that the mobile phone 100a moves leftward. If the acceleration value first exceeds the lower threshold, it indicates that the mobile phone 100a moves rightward.

According to some embodiments of this application, in duration of the L sampling points, acceleration values of the sampling points in the X-axis direction may be traversed to obtain a scatter waveform diagram, and find a peak and a trough. Similarly, an upper threshold and a lower threshold of the acceleration of the mobile phone 100a are preset, a peak lower than the upper threshold and a trough higher than the lower threshold are discarded, and a sequence of remaining peaks and troughs is determined. If a peak appears first, it indicates that the mobile phone 100a moves leftward; or if a trough appears first, it indicates that the mobile phone 100a moves rightward. In this implementation, whether the mobile phone 100a is shaking may be further determined by collecting statistics on a quantity of remaining peaks and troughs after the discarding operation. If the quantity of peaks and troughs is greater than a preset quantity threshold, it indicates that the mobile phone 100a is shaking instead of moving in one direction.

For a purpose of improving determining accuracy, threshold comparison and movement direction determining of the mobile phone 100a may be performed after a time period (for example, 0.2 seconds) after the gesture starts, to avoid incorrect determining at an initial stage of the gesture.

A case in which the Y axis is the maximum-energy axis and a case in which the Z axis is the maximum-energy axis are similar to the foregoing process. Details are not described herein again.

A movement manner of the mobile phone 100a, that is, a gesture operation, may be obtained by determining a maximum-energy axis and a change of an acceleration value in a direction of the maximum-energy axis. After the movement manner of the mobile phone 100a is obtained, a mapping relationship between each gesture and a specific operation to be started may be defined by defining a correspondence between a movement manner of the mobile phone 100a and both a transmission direction and transmission content. For example, according to some embodiments of this application, motions of the mobile phone 100a may be classified into: moving leftward, moving rightward, moving forward, moving backward, moving upward, moving downward, shaking, and the like, and content to be transmitted between the mobile phone 100a and the computer 100b and a content transmission direction are determined for each motion.

Table 1 shows an example of a correspondence between movement of the mobile phone 100a and both a transmission direction and transmission content according to some embodiments of this application.

TABLE 1

| Movement of the mobile phone 100a | Transmission direction and transmission content |
| --- | --- |
| Move rightward | An interface and a running status of an application of the mobile phone 100a are directly migrated and presented on a screen of the computer 100b |
| Move leftward | An interface and a running status of an application on a desktop of the computer 100b are directly migrated and presented on a screen of the mobile phone 100a |
| Move forward | A file, an image, a document, a contact, a voice, a video, and the like in the mobile phone 100a are directly migrated and presented on a screen of the computer 100b |
| Move backward | A file, an image, a document, a contact, a voice, a video, and the like on a desktop of the computer 100b are directly migrated and presented on a screen of the mobile phone 100a |
| Shake | A desktop screenshot of the computer 100b is directly migrated and presented on a screen of the mobile phone 100a |

The correspondence between movement of the mobile phone 100a and both a transmission direction and transmission direction shown in Table 1 is merely an example for description. In different implementations, various different correspondences may be defined through cooperation with each piece of application software in the mobile phone 100a.

According to some embodiments of this application, only a transmission direction may be defined, and transmission content is not defined. For example, current content (including a desktop, an application, an image, and a video) in the mobile phone 100a and the computer 100b is directly transferred from one end to the other end, so that what is seen is what is got, and running statuses are kept consistent.

For example, it may be defined that moving forward means that the mobile phone 100a sends content to the computer 100b, and moving backward means that the mobile phone 100a receives content from the computer 100b. In this case, when it is detected that the mobile phone 100a is moved forward, if the mobile phone 100a is in a home-screen state (no application is opened), a home screen of the mobile phone 100a is transmitted to the computer 100b; if the mobile phone 100a opens an application, an interface and a running status are directly migrated and presented on a screen of the computer 100b, and running statuses are kept consistent; or if the mobile phone 100a opens an image or a video, the image or the video on the mobile phone 100a is directly migrated and presented on the screen of the computer 100b.

It should be noted that the foregoing definitions of the movement directions of the mobile phone 100a are on a basis that the front side of the mobile phone 100a faces upward and the mobile phone 100a is held in a forward direction. If the mobile phone 100a is held in a reverse direction, a movement direction of holding the mobile phone 100a may be opposite to an actual direction of transmitting content.

S11: After the mobile phone 100a determines the transmission direction and the transmission content based on the recognized user gesture, the mobile phone 100a may send the determined transmission direction and the determined transmission content to the computer 100b.

For example, based on the correspondence shown in Table 1, if it is recognized in S10 that the movement manner of the mobile phone 100a is moving leftward, a corresponding transmission direction and transmission content are as follows: The interface and the running status of the application on the desktop of the computer 100b are directly migrated and presented on the screen of the mobile phone 100a. The mobile phone 100a may send the transmission direction and the transmission content to the computer 100b, so that the computer 100b prepares for sending data related to the interface and the running status of the application on the desktop to the mobile phone 100a.

S12: The mobile phone 100a and the computer 100b may negotiate a Wi-Fi connection parameter through Bluetooth handshake, to prepare for content sharing between the mobile phone 100a and the computer 100b.

According to some embodiments of this application, content sharing between the mobile phone 100a and the computer 100b may be performed by using Wi-Fi direct (also referred to as Wi-Fi P2P), to obtain a higher data transmission speed. As a peer-to-peer connection technology, Wi-Fi direct may directly establish a TCP/IP connection between the two terminal devices: the mobile phone 100a and the computer 100b without participation of an additional access point (AP). One of the mobile phone 100a and the computer 100b may serve as a group owner (GO) and play a role of a conventional AP, and the other of the mobile phone 100a and the computer 100b serves as a group client (GC) and connects to a terminal device that functions as a GO in a manner similar to connecting to an AP.

In operation S12, the Wi-Fi connection parameter negotiated by the mobile phone 100a and the computer 100b may include a service set identifier (SSID) and a password of a Wi-Fi GO.

S13: The mobile phone 100a and the computer 100b establish a Wi-Fi direct connection based on the Wi-Fi connection parameter negotiated in S12.

S14: Transmit, by using Wi-Fi, the transmission content determined in operation S10 from one of the mobile phone 100a and the computer 100b to the other based on the transmission direction determined in operation S10.

A Miracast projection technology may be used for content transmission between the mobile phone 100a and the computer 100b. After the mobile phone 100a and the computer 100b are networked by using Wi-Fi P2P, an end that sends data is used as a source end, and an end that receives data is used as a sink end. Then, the two ends may transmit data by using a transmission protocol such as TCP or UDP, to send content (including a desktop, an application, an image, audio, a video, and the like) of the source end to the sink end. After the mobile phone 100a establishes a session with the computer 100b, a UIBC may be further established by using a user input back channel (UIBC) establishment function in the Miracast projection technology, to implement back control of the user for the source end at the sink end.

For example, based on Table 1, when it is recognized that the movement of the mobile phone 100a is moving rightward, the mobile phone 100a sends data related to the interface and the running status of the application to the computer 100b. The mobile phone 100a is a source end, and the computer 100b is a sink end. By using the Miracast projection technology, the interface and the running status of the application of the mobile phone 100a are directly migrated and presented on the screen of the computer 100b, and a status presented by the computer 100b is kept consistent with a status run on the mobile phone 100a. The user may operate a desktop of the mobile phone on the computer 100b in a keyboard, mouse, or touch manner.

In this embodiment of this application, the Bluetooth connection is used as a control channel, and the Wi-Fi connection is used as a data channel, to improve a content sharing speed by using a feature of a high Wi-Fi data transmission speed. However, a person skilled in the art should understand that, in some implementations, operations S12 and S13 may not be included, and to-be-shared data is directly transmitted by using Bluetooth. Alternatively, in some other implementations, the mobile phone 100a and the computer 100b may establish another communication connection by using another communications protocol, to transmit the to-be-shared data in another manner.

S15: After the transmission is completed, the mobile phone 100a may determine whether the user wants to continue sharing other content. For example, the mobile phone 100a may output a prompt message by using an interface, a sound, or the like, to prompt the user whether to continue sharing.

When the user needs to continue sharing (that is, a determining result in S15 is yes), the user may return to operation S10, recognize a user gesture again, determine a transmission direction and transmission content based on the recognized user gesture, and then continue to perform operations S11 and S14. Because the Wi-Fi connection has been established between the mobile phone 100a and the computer 100b, operations S12 and S13 may be skipped.

When the user does not need to continue sharing (that is, the determining result in S15 is no), S16 in the method may continue to be performed: Disconnect the Wi-Fi connection between the mobile phone 100a and the computer 100b.

According to some embodiments of this application, operation S16 may not be performed immediately after the transmission is completed, but is performed after a specific time period after the transmission is completed. For example, a wait event, for example, 2 minutes, may be preset, and the disconnection operation of S16 is performed when no action is performed within 2 minutes after the transmission of the content is completed.

In the foregoing embodiments of this application described with reference to FIG. 2A and FIG. 2B, control logic in the mobile phone 100a and the computer 100b may use various architectures, for example, a layered architecture, an event-driven architecture, a microkernel architecture, a microservice architecture, or a cloud architecture. The following uses a system with a layered architecture as an example to describe a specific solution for implementing a content sharing system provided in embodiments of this application.

Figure 4A:
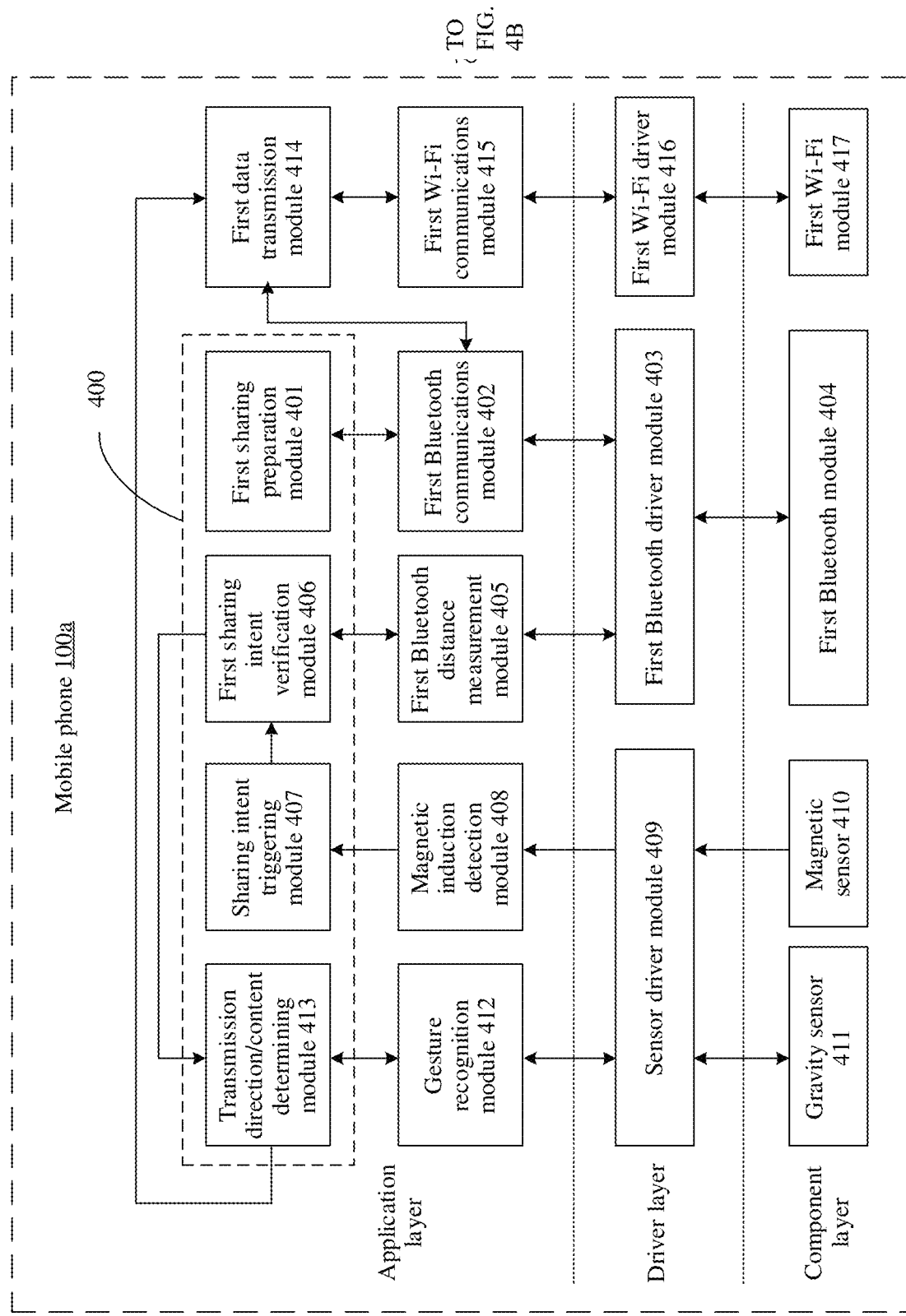
FIG. 4A and FIG. 4B show a specific implementation of sharing content between a mobile phone and a computer according to an embodiment of this application.
Figure 4B:
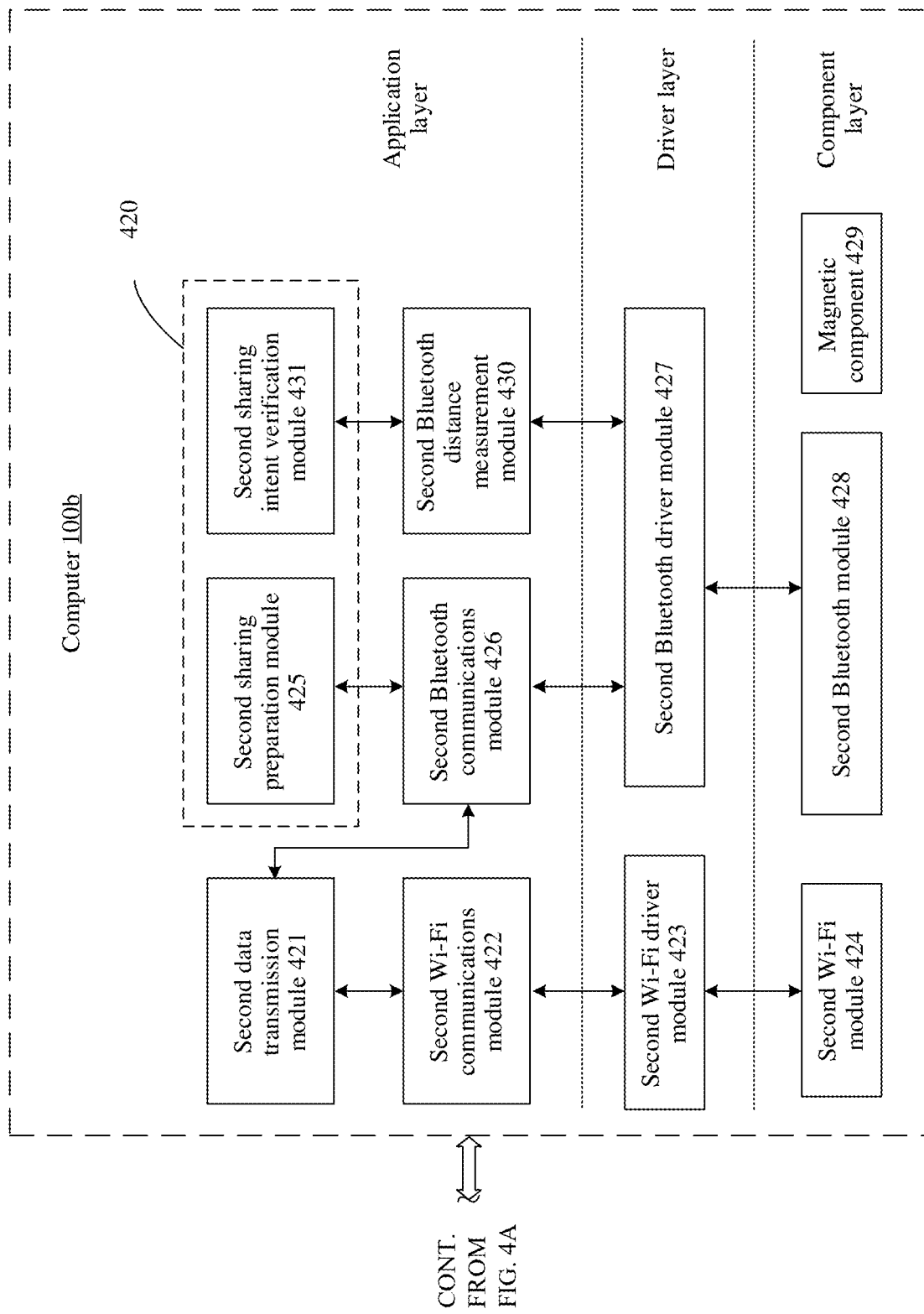

FIG. 4A and FIG. 4B show specific examples of structures of the mobile phone 100a and the computer 100b that implement the content sharing party system shown in FIG. 2A and FIG. 2B.

As shown in FIG. 4A and FIG. 4B, control logic may be divided into several layers by using a layered architecture, and each layer has a clear role and task. Layers can communicate with each other through interfaces. According to some embodiments of this application, control logic of the mobile phone 100a and the computer 100b each may be divided into three layers: an application layer, a driver layer, and a component layer.

In the mobile phone 100a and the computer 100b, the application layer may include one or more application packages, configured to perform content sharing preparation, sharing intent triggering, sharing intent verification, logic determining of shared content and direction identification, control of data transmission, and the like. The sharing preparation, sharing intent triggering, sharing intent verification, and logic determining of shared content and direction identification may be integrated into a content sharing determining module, configured to determine content sharing, and a data transmission module may be configured to perform the control of data transmission.

As shown in FIG. 4A and FIG. 4B, the application layer of the mobile phone 100a includes a first content sharing determining module 400 and a first data transmission module 414. The first content sharing determining module 400 includes a first sharing preparation module 401, a first sharing intent verification module 406, a sharing intent triggering module 407, and a transmission direction/content determining module 413. The application layer of the computer 100b includes a second content sharing determining module 420 and a second data transmission module 421. The second content sharing determining module 420 includes a second sharing preparation module 425 and a second sharing intent verification module 431. Each module of the foregoing application layer may implement a corresponding function by separately invoking a lower-level module.

Specifically, first, the first content sharing determining module 400 of the mobile phone 100a cooperates with the second content sharing determining module 420 of the computer 100b to perform content sharing determining, that is, operations S1 to S10 in FIG. 2A and FIG. 2B.

First, S1 is performed: The mobile phone 100a and the computer 100b approach to each other, identify each other by using Bluetooth, and perform Bluetooth pairing to establish a persistent connection.

In the mobile phone 100a, the first sharing preparation module 401 at the application layer invokes a first Bluetooth communications module 402, and the first Bluetooth communications module 402 sends an instruction to a first Bluetooth driver module 403 at the driver layer, to invoke a first Bluetooth module 404 at the component layer.

In the computer 100b, the second sharing preparation module 425 at the application layer invokes a second Bluetooth communications module 426, and the second Bluetooth communications module 426 sends an instruction to a second Bluetooth driver module 427 at the driver layer, to invoke a second Bluetooth module 428 at the component layer.

The first Bluetooth module 404 and the second Bluetooth module 428 separately send a Bluetooth broadcast signal in response to the separate instruction from the driver layer, and when the mobile phone 100a approaches the computer 100b, the mobile phone 100a and the computer 100b identify each other by using a Bluetooth name or the like, and perform Bluetooth pairing to establish a Bluetooth persistent connection.

Subsequently, S2 and S3 are performed: After the connection is established, the two terminal devices trigger a data transmission intent, and the mobile phone 100a monitors a change in the magnetic induction signal strength of the mobile phone 100a in real time by using an internal magnetic sensor.

Various terminal devices such as the computer 100b are complex magnetic fields. In the computer 100b, a large quantity of magnetic components 429 usually exist. In this application, the magnetic component 429 is a component that causes magnetic interference.

According to some embodiments of this application, a notebook computer is used as an example. A magnetic sensor usually exists in the notebook computer and is disposed on a keyboard part (that is, usually referred to as a surface C). Correspondingly, a magnetic component usually exists in a screen part (that is, usually referred to as a surface B), to cooperate with the magnetic sensor to control the computer to sleep or work. For example, when the screen part and the keyboard part of the notebook computer are closed, the magnetic component of the screen part is close to the magnetic sensor, resulting in a change of a magnetic field near the magnetic sensor. This enables the magnetic sensor to sense a change of a screen status, and enables the notebook computer to enter a sleep state by using a peripheral circuit and a system, to reduce power consumption. When the screen is lifted, the magnetic component is far away from the magnetic sensor, and the notebook computer restores to a normal working state. For another example, a heat dissipation fan of a notebook computer usually includes a stator and a rotor, and both the stator and the rotor are magnetic components.

According to some embodiments of this application, for a purpose of improving intensity of a change in the magnetic induction signal strength of the mobile phone 100a, an additional magnetic component 429 may also be installed in the computer 100b, or an existing magnetic component 429 may be optimized, so that the magnetic component 429 has a larger area or higher intensity of magnetic interference.

In the mobile phone 100a, the magnetic sensor 410 at the component layer monitors a change in the magnetic induction signal strength of the mobile phone 100a. Examples of the magnetic sensor 410 include but are not limited to a Hall effect-based Hall effect sensor, an anisotropic magnetoresistance (Anisotropic Magneto Resistance, AMR) effect-based AMR sensor, and the like. In various terminal devices, an AMR sensor is used as an example. The AMR sensor may measure a plane magnetic field by using magnetic resistance, to detect magnetic field strength and a direction location. A basic principle of the AMR sensor is that a change in resistance of the AMR sensor occurs when a weak magnetic field change is sensed by using an anisotropic magnetic resistance material. The Hall effect sensor detects a change of a magnetic field according to a Hall effect principle that a voltage difference is generated when a change occurs on a direction of a peripheral magnetic field of a semiconductor.

The magnetic sensor 410 in the mobile phone 100a is usually used in a compass or map navigation, to help a user implement accurate positioning, or is configured to detect opening and closing of a flip cover. In this embodiment of this application, the magnetic sensor 410 is configured to sense whether a magnetic component exists nearby.

When a magnetic interference source appears near the mobile phone 100a, a sharp change occurs on the magnetic induction signal strength detected by the magnetic sensor 410 in the mobile phone 100a. The magnetic sensor 410 in the mobile phone 100a reports a detected magnetic induction signal to the driver layer. A sensor driver module 409 at the driver layer processes a received magnetic interference signal to determine magnetic induction signal strength, and further reports the magnetic induction signal strength to a magnetic induction detection module 408 at the application layer. After receiving information of the magnetic induction signal strength, the magnetic induction detection module 408 may analyze and determine the change in the magnetic induction signal strength, determine whether the change exceeds a preset magnetic induction signal strength change threshold, and when the change exceeds the preset magnetic induction signal strength change threshold, send information to the sharing intent triggering module 407 to trigger a sharing intent.

Subsequently, in S4, for a purpose of verifying the magnetic interference source approaching the mobile phone 100a is the computer 100b that is persistently connected to the mobile phone 100a or another magnetic interference source, the mobile phone 100a may verify the sharing intent.

In the mobile phone 100a, the first sharing intent triggering module 407 at the application layer sends sharing intent triggering information to the first sharing intent verification module 406. The first sharing intent verification module 406 sends a first verification instruction to a first Bluetooth distance measurement module 405. The first Bluetooth distance measurement module 405 is enabled. The first Bluetooth distance measurement module 405 at the application layer sends a signal to the first Bluetooth driver module 403 in response to the received first verification instruction, to control, by using the first Bluetooth driver module 403, the first Bluetooth module 404 to send a Bluetooth broadcast signal.

S5 and S6: The computer 100b determines a distance between the computer 100b and the mobile phone 100a based on strength of the received Bluetooth signal, compares the determined distance with a preset threshold, and determine whether the distance between the computer 100b and the mobile phone 100a is less than the preset distance threshold.

In the computer 100b, after receiving the Bluetooth broadcast signal sent by the mobile phone 100a, the second Bluetooth module 428 may report the received Bluetooth signal to the second Bluetooth driver module 427 at the driver layer. Then, the second Bluetooth driver module 427 may process data sent by the second Bluetooth module 428, to determine strength of the Bluetooth signal and the like, and report the strength of the Bluetooth signal to a second Bluetooth distance measurement module 430 at the application layer, so that the second Bluetooth distance measurement module 430 in the computer 100b may determine the distance between the computer 100b and the mobile phone 100a based on the received strength of the Bluetooth signal. For example, the distance between the computer 100b and the mobile phone 100a may be determined by using Formula (1).

The second Bluetooth distance measurement module 430 reports the determined distance to the second sharing intent verification module 431, and the second sharing intent verification module 431 determines whether the distance between the computer 100b and the mobile phone 100a is less than the preset distance threshold.

According to some embodiments of this application, when distance determining is performed on the computer 100b, S7 may be performed at the same time: Bluetooth broadcast may also be enabled, so that distance verification is enabled on both the mobile phone 100a and the computer 100b.

The second sharing intent verification module 431 at the application layer of the computer 100b sends a second verification instruction to the second Bluetooth distance measurement module 430, and the second Bluetooth distance measurement module 430 sends an instruction to the second Bluetooth driver module 427 in response to the second verification instruction, to control, by using the second Bluetooth driver module 427, the second Bluetooth module 428 to send a Bluetooth broadcast signal.

S8 and S9: For the mobile phone 100a, the mobile phone 100a may also determine a distance between the mobile phone 100a and the computer 100b based on strength of the received Bluetooth signal from the computer 100b, and determine whether the distance between the mobile phone 100a and the computer 100b is less than the preset distance threshold.

Specifically, in the mobile phone 100a, after receiving the Bluetooth broadcast signal sent by the computer 100b, the first Bluetooth module 404 reports the received Bluetooth signal to the first Bluetooth driver module 403 at the driver layer. The first Bluetooth driver module 403 may process data sent by the first Bluetooth module 404, to determine strength of the Bluetooth signal and the like, and report the strength of the Bluetooth signal to a first Bluetooth distance measurement module 405 at the application layer, so that the first Bluetooth distance measurement module 405 in the mobile phone 100a may determine the distance between the mobile phone 100a and computer 100b based on the received strength of the Bluetooth signal and by using Formula (1).

In this way, accuracy of distance monitoring can be further improved through double verification performed by the two terminal devices: the mobile phone 100a and the computer 100b. When both the first sharing intent verification module 406 in the mobile phone 100a and the second sharing intent verification module 431 in the computer 100b measure that the distance between the mobile phone 100a and the computer 100b is less than the preset threshold, it may be considered that the magnetic interference event for the mobile phone 100a is not caused by an accidental trigger of another magnetic interference source, but is indeed a magnetic interference event caused by the magnetic component 429 in the computer 100b because the mobile phone 100a approaches the computer 100b.

Certainly, in some other embodiments, the distance between the mobile phone 100a and the computer 100b may also be measured by using another solution, for example, the Bluetooth single-end distance measurement, millimeter-wave distance measurement, or ultrasonic distance measurement that are described above.

S10: The mobile phone 100a starts to recognize the user gesture, to determine to-be-transmitted content and a transmission direction based on the user gesture.

According to some embodiments of this application, as described above with reference to FIG. 2A and FIG. 2B, identification of transmission content and direction is determined through user gesture recognition, and the user gesture may be determined by detecting a movement manner of the mobile phone 100a. In some implementations, a mapping relationship (for example, Table 1 described above) between a gesture and a specific operation to be started may be preset, and the mapping relationship is prestored in the mobile phone 100a.

The movement manner (for example, moving leftward or moving rightward) of the mobile phone 100a may be determined by using a gravity sensor 411 in the mobile phone 100a. The gravity sensor 411 is also referred to as a gravity inductor. In an implementation, the gravity sensor 411 uses a cantilever-type displacement device made of an elastic sensitive element and an energy storage spring made of an elastic sensitive element, to drive an electrical contact, so as to complete conversion from a gravity change to an electrical signal. Gravity sensors 411 are widely used in various portable computing devices such as mobile phones and tablet computers. For example, the gravity sensor 411 may be configured to recognize a posture or a movement manner of the mobile phone 100a, and is used in applications such as a pedometer and switching between a landscape mode and a portrait mode. In various terminal devices such as the mobile phone 100a, common gravity sensors include but are not limited to Bosch BMA series, STMicroelectronics (ST) LIS3X series, and the like.

A specific manner for determining movement of the mobile phone 100a by using the gravity sensor 411 in the mobile phone 100a is as follows:

In the mobile phone 100a, the transmission direction/content determining module 413 at the application layer sends a gesture recognition instruction to a gesture recognition module 412. The gesture recognition module 412 sends a signal to the sensor driver module 409 at the driver layer in response to the received gesture recognition instruction, so that the sensor driver module 409 enables the gravity sensor 411 at the component layer.

The gravity sensor 411 detects magnitudes of accelerations of the mobile phone 100a in various directions (usually on three axes), and further reports acceleration data to the sensor driver module 409 at the driver layer. The sensor driver module 409 processes the received acceleration data, calculates an acceleration value, a direction, and the like, and reports the acceleration value, the direction, and the like to the gesture recognition module 412 at the application layer.

The gesture recognition module 412 generates an acceleration change vector by using the measured acceleration value, direction, and the like, to obtain movement of the mobile phone 100a, and reports the movement of the mobile phone 100a to the transmission direction/content determining module 413.

In this way, the transmission direction/content determining module 413 may determine transmission content and a transmission direction based on the movement of the mobile phone 100a and Table 1. For example, assuming that the movement of the mobile phone measured by the gesture recognition module 412 in the mobile phone 100a is moving rightward, the transmission direction/content determining module 413 may determine, based on Table 1, that the movement corresponds to the transmission direction and content that the interface and the running status of the application of the mobile phone 100a are directly migrated and presented on the screen of the computer 100b. That is, the transmission direction is from the mobile phone 100a to the computer 100b, and the transmission content is the interface and the running status of the application of the mobile phone 100a.

In some embodiments of this application, the motion of the mobile phone 100a may alternatively be determined in another manner. The another manner includes but is not limited to using a linear accelerometer, a gyroscope sensor, a positioning system, or the like. For example, the gyroscope sensor may determine angular velocities of the mobile phone 100a around three axes (that is, x, y, and z axes). Therefore, the gyroscope sensor may also be configured to determine movement of the mobile phone 100a. Alternatively, in some implementations, the motion of the mobile phone 100a may be determined by using a combination of a linear accelerometer, a gyroscope sensor, a gravity sensor, and the like, to further determine a user gesture.

S11: After determining the transmission direction and the transmission content, the mobile phone 100a sends the determined transmission direction and the determined transmission content to the computer 100b, where the information may still be sent by using the Bluetooth channel.

In the mobile phone 100a, the transmission direction/content determining module 413 at the application layer sends the determined transmission direction (that is, from the mobile phone 100a to the computer 100b) and the determined transmission content (that is, the interface and the running status of the application of the mobile phone 100a) to the first data transmission module 414. The first data transmission module 414 sends a communication instruction to the first Bluetooth communications module 402, so that the first Bluetooth communications module 402 drives the first Bluetooth module 404 by using the first Bluetooth driver module 403 at the driver layer, to send the determined transmission direction and the determined transmission content to the computer 100b.

In the computer 100b, after receiving the information sent by the mobile phone 100a, the first Bluetooth module 428 reports the received information to the second Bluetooth communications module 426 by using the second Bluetooth driver module 427. The second Bluetooth communications module 426 processes the received information, obtains the transmission direction and the transmission content, and reports the transmission direction and the transmission content to the second data transmission module 421, so that the computer 100b obtains the transmission direction and the transmission content that are determined by the mobile phone 100a.

S12: The mobile phone 100a and the computer 100b negotiate a Wi-Fi connection parameter through Bluetooth handshake.

For example, the mobile phone 100a is used as a GO in a Wi-Fi direct connection. In the mobile phone 100a, the first data transmission module 414 at the application layer sends a communication instruction to the first Bluetooth communications module 402, so that the first Bluetooth communications module 402 drives the first Bluetooth module 404 by using the first Bluetooth driver module 403 at the driver layer, and sends an SSID and a password of the mobile phone 100a as the GO to the computer 100b.

In the computer 100b, after receiving the information sent by the mobile phone 100a, the first Bluetooth module 428 at the component layer reports the received information to the second Bluetooth communications module 426 by using the second Bluetooth driver module 427. The second Bluetooth communications module 426 processes the received information, obtains the SSID and the password of the GO, and reports the SSID and the password to the second data transmission module 421.

S13: The mobile phone 100*a* and the computer 100*b* establish a Wi-Fi connection based on the Wi-Fi connection parameter negotiated in S12.

In the mobile phone 100*a*, the first data transmission module 414 sends a communication instruction to a first Wi-Fi communications module 415, so that the first Wi-Fi communications module 415 drives, by using a first Wi-Fi driver module 416 at the driver layer, a first Wi-Fi module 417 to enable a Wi-Fi direct function.

In the computer 100*b*, the second data transmission module 421 sends a communication instruction to a second Wi-Fi communications module 422, so that the second Wi-Fi communications module 422 drives, by using a second Wi-Fi driver module 423 at the driver layer, a second Wi-Fi module 424, to enable a Wi-Fi direct function and establish a Wi-Fi connection to the mobile phone 100*a* by using the SSID and password obtained in operation S12.

S14: Send the interface and the running status of the application of the mobile phone 100*a* to the computer 100*b* by using Wi-Fi through a Wi-Fi communication link between the mobile phone 100*a* and the computer 100*b*.

In this embodiment of this application, the Bluetooth connection is used as a control channel, and the Wi-Fi connection is used as a data channel, to improve a content sharing speed by using a feature of a high Wi-Fi data transmission speed. However, a person skilled in the art should understand that, in some implementations, operations S12 and S13 may not be included, and to-be-shared data is directly transmitted by using Bluetooth. Alternatively, in some other implementations, the mobile phone 100*a* and the computer 100*b* may establish another communication connection by using another communications protocol, to transmit the to-be-shared data in another manner.

An example of a specific content sharing process according to embodiments of this application is described above with reference to FIG. 2A and FIG. 2B and FIG. 4A and FIG. 4B. A person skilled in the art should understand that many operations may be implemented in parallel, concurrently, or simultaneously. In addition, a sequence of the operations may also be rearranged.

In addition, specific components, modules, and the like shown in FIG. 4A and FIG. 4B are examples for description and do not constitute a limitation on this application. In another embodiment of this application, different components and modules may also be used to implement the content sharing solution of this application in another manner.

For example, when the mobile phone 100*a* performs gesture recognition, the gravity sensor 411 in FIG. 4A and FIG. 4B may be replaced with another component, for example, a linear accelerometer or a gyroscope sensor. Alternatively, in some implementations, movement detection of the mobile phone 100*a* may be implemented by using a combination of a plurality of components.

For another example, when performing the sharing intent verification, the first sharing intent verification module 406 and/or the second sharing intent verification module 431 may also perform distance measurement by using another component other than the Bluetooth module. For example, the first sharing intent verification module 406 and/or the second sharing intent verification module 431 may invoke, by using the driver layer, an ultrasonic module, a millimeter-wave module, and the like in the mobile phone 100*a*, to implement a distance measurement operation.

In addition, some operations shown in FIG. 2A and FIG. 2B and FIG. 4A and FIG. 4B may also be implemented by using other solutions. For example, in operation S10 performed by the mobile phone 100*a*, that is, recognizing the user gesture and determining to-be-transmitted content and a transmission direction based on the user gesture, the user gesture may not be a movement of the mobile phone 100*a* held by the user, but another gesture operation.

According to some embodiments of this application, for example, when the mobile phone 100*a* includes a touchscreen, the user gesture may alternatively be a touch operation such as sliding, dragging, tapping, or touching and holding performed by the user on a surface of the touchscreen of the mobile phone 100*a*. In this case, the user gesture may be determined by recognizing touch input (for example, left sliding, right sliding, or touching and holding) of the mobile phone 100*a*, and each gesture may be mapped to a specific operation to be started.

In this embodiment, the touchscreen of the mobile phone 100*a* may be various types of touchscreens, for example, a capacitive touchscreen, a resistive touchscreen, an infrared touchscreen, a surface acoustic wave touchscreen, or another type of touchscreen. The touch operation of the user may be received by using the touchscreen of the mobile phone 100*a*. The touchscreen may include a touch sensor and a display. The touch sensor is also referred to as a "touch component". In some embodiments, the touch sensor may be disposed on the display, and is configured to detect a touch operation performed on or near the touch sensor. The touch sensor may transfer the detected touch operation to an application processor to determine a type of a touch event.

According to some embodiments of this application, in S1, when the mobile phone 100*a* starts to recognize the user gesture, in the mobile phone 100*a*, the transmission direction/content determining module 413 at the application layer sends a gesture recognition instruction to a gesture recognition module 412. The gesture recognition module 412 sends a signal to the sensor driver module 409 at the driver layer in response to the received gesture recognition instruction, so that the sensor driver module 409 enables the touch sensor at the component layer.

The touch sensor receives the touch operation performed by the user on the touchscreen of the mobile phone 100*a*. For example, when a finger of the user approaches or touches the mobile phone 100*a* having a touchscreen function, the touch sensor of the mobile phone 100*a* detects the operation performed on the touchscreen of the mobile phone 100*a*, and further reports touch data to the sensor driver module 409 at the driver layer. The sensor driver module 409 at the driver layer of the mobile phone 100*a* may process the data reported by the touch sensor on the touchscreen, recognize operations such as tapping, sliding, and touching and holding, calculate coordinate information of these operations, generate timestamps and the like, and report an input event including an operation type, coordinate information, a timestamp, and the like to the gesture recognition module 412 at the application layer. Further, the gesture recognition module 412 may determine transmission content and direction based on a preset mapping relationship (for example, the mapping relationship shown in the following Table 2) between a touch operation and a transmission direction and transmission content.

Table 2 shows an example of a mapping relationship between a touch operation performed on the mobile phone 100a and a transmission direction and transmission content according to some embodiments of this application.

TABLE 2

| Touch operation performed on the mobile phone 100a | Transmission direction and transmission content |
| --- | --- |
| Slide rightward | An interface and a running status of an application of the mobile phone 100a are directly migrated and presented on a screen of the computer 100b |
| Slide leftward | An interface and a running status of an application on a desktop of the computer 100b are directly migrated and presented on a screen of the mobile phone 100a |
| Slide forward | A file, an image, a document, a contact, a voice, a video, and the like in the mobile phone 100a are directly migrated and presented on a screen of the computer 100b |
| Slide backward | A file, an image, a document, a contact, a voice, a video, and the like on a desktop of the computer 100b are directly migrated and presented on a screen of the mobile phone 100a |
| Touch and hold | A desktop screenshot of the computer 100b is directly migrated and presented on a screen of the mobile phone 100a |

In addition, according to some embodiments of this application, the user gesture may also include another type, for example, a gesture operation (for example, a floating touch) that may be performed on the mobile phone 100a but having an interval of a specific distance from the screen of the mobile phone 100a. In addition, in some embodiments, another input device such as a stylus may also be used to input a gesture.

In addition, although in FIG. 2A and FIG. 2B and FIG. 4A and FIG. 4B, an example in which content is shared between the mobile phone 100a and the computer 100b is used to describe a content sharing process between terminal devices, it should be understood that the content sharing solution provided in embodiments of this application may be applied between various terminal devices, for example, between a mobile phone and a mobile phone, between a smartwatch and a mobile phone, and between a band and a computer.

The content sharing solution provided in embodiments of this application simplifies a data transmission process. In addition, compared with a case in which a manner such as NFC contact can be applied only to a short transmission distance, the content sharing solution provided in this application can be applied to a longer distance. In addition, a transmission direction and transmission content are determined through gesture recognition, so that bidirectional transmission between two devices is implemented, and an error in a transmission direction can be effectively avoided.

Figure 5:
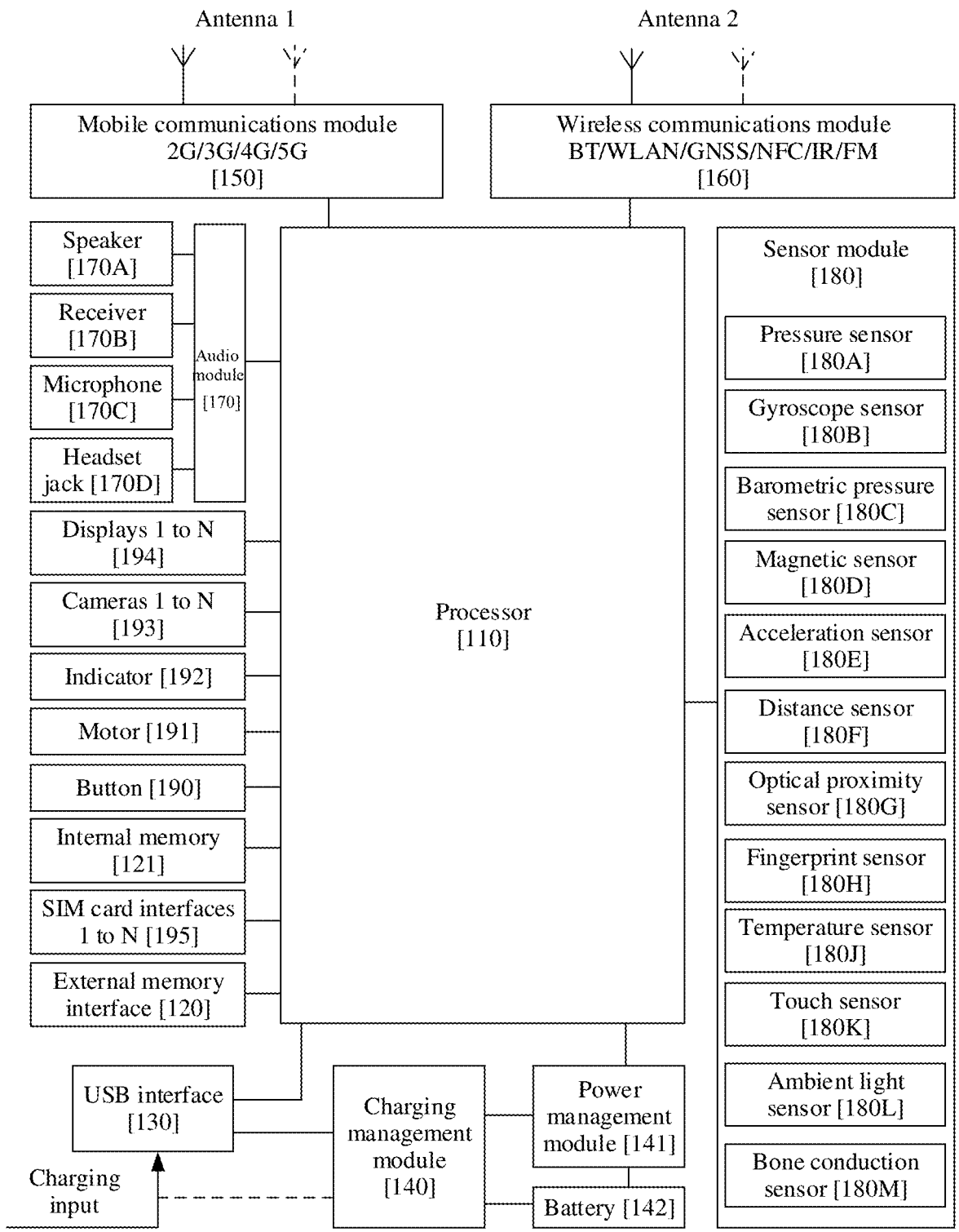
FIG. 5 is a schematic diagram of a structure of a terminal device according to an embodiment of this application.

The following uses a mobile phone as an example to describe a specific example of a structure of the terminal device 100 in this application with reference to FIG. 5. In some embodiments, the device shown in FIG. 5 may be the mobile phone 100a or may be included in the mobile phone 100a.

As shown in FIG. 5, the terminal device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. A memory may be further disposed in the processor 110, and is configured to store instructions and data. In some cases, the processor 110 may be configured to perform various operations performed by the mobile phone 100a described with reference to FIG. 2A to FIG. 4B.

In some embodiments, the processor no may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. It can be understood that an interface connection relationship between the modules illustrated in this embodiment of this application is merely an example for description, and does not constitute a limitation on the structure of the terminal device 100. In some other embodiments of this application, the terminal device 100 may alternatively use an interface connection manner different from that in the foregoing embodiment, or use a combination of a plurality of interface connection manners.

The sensor module 180 may include a magnetic sensor 180D. Examples of the magnetic sensor 180D include but are not limited to a Hall effect-based Hall effect sensor, an anisotropic magnetoresistance (Anisotropic Magneto Resistance, AMR) effect-based AMR sensor, and the like. In various terminal devices 100, an AMR sensor is used as an example. The AMR sensor may measure a plane magnetic field by using magnetic resistance, to detect magnetic field strength and a direction location. A basic principle of the AMR sensor is that a change in resistance of the AMR sensor occurs when a weak magnetic field change is sensed by using an anisotropic magnetic resistance material. The Hall effect sensor detects a change of a magnetic field according to a Hall principle that a voltage difference is generated when a change occurs on a direction of a peripheral magnetic field of a semiconductor.

The magnetic sensor 180D in the terminal device 100 is usually used in a compass or map navigation, to help a user implement accurate positioning, or is configured to detect opening and closing of a flip cover. In some embodiments, when the terminal device 100 is a flip phone, the terminal device 100 may detect, by using the magnetic sensor 180D, whether a flip cover is opened or closed, and further set, based on a detected opened or closed state of the flip cover, a feature such as automatic unlocking of the flip cover.

In some embodiments of this application, the terminal device 100 may sense, by using the magnetic sensor 180D, whether a magnetic component exists nearby.

An acceleration sensor 180E may detect magnitudes of accelerations of the terminal device 100 in various directions (usually on three axes). A magnitude and a direction of gravity may be detected when the terminal device 100 is still. The acceleration sensor 180E may be further configured to recognize a posture or movement of the terminal device 100, and is used in applications such as a pedometer and switching between a landscape mode and a portrait mode.

According to some embodiments of this application, the acceleration sensor 180E may include a gravity sensor. The gravity sensor is also referred to as a gravity inductor. In an implementation, the gravity sensor uses a cantilever-type displacement device made of an elastic sensitive element and an energy storage spring made of an elastic sensitive element, to drive an electrical contact, so as to complete conversion from a gravity change to an electrical signal. The gravity sensors are widely used in various portable computing devices such as mobile phones and tablet computers. In various terminal devices 100, common gravity sensors include but are not limited to Bosch BMA series, STMicroelectronics (ST) LIS3X series, and the like.

The gravity sensor can sense a change in acceleration, and further determine a motion of the terminal device 100 by using an acceleration value, for example, tilting, shaking left and right, rising, or falling. The gravity sensor in the terminal device 100 is usually of a structure with three axes. The gravity sensor may sense acceleration in any direction by using the three axes, and determine a spatial motion of the terminal device 100. When the gravity sensor calculates acceleration on the three axes, gravity sensing coordinates are usually relative to the terminal device 100 instead of spatial coordinates.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may also be configured to determine movement of the device. For example, the gyroscope sensor 180B may be configured to perform image stabilization during image shooting. When a shutter is pressed, the gyroscope sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyroscope sensor 180B may also be used in a navigation scenario and a somatic game scenario.

A touch sensor 180K is also referred to as a "touch component". The touch sensor 180K may be disposed in the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may alternatively be disposed on a surface of the electronic device 100 at a location different from that of the display 194.

The sensor module 180 may include a pressure sensor 180A, a barometric pressure sensor 180C, a distance sensor 180F, an optical proximity sensor 180G, a fingerprint sensor 180H, a temperature sensor 180J, an ambient light sensor 180L, a bone conduction sensor 180M, and the like.

The charging management module 140 is configured to receive a charging input from a charger. The charger may be a wireless charger or a wired charger. The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution applied to the terminal device 100, including 2G, 3G, 4G, 5G, or the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like and that is applied to the terminal device 100. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the terminal device 100 is coupled to the mobile communications module 150, and the antenna 2 is coupled to the wireless communications module 160, so that the terminal device 100 can communicate with a network and another device by using a wireless communication technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function by using the GPU, the display 194, the application processor, and the like. The display 194 is configured to display an image, a video, and the like.

The terminal device 100 may implement an image shooting function by using the ISP, the camera 193, the video codec, the GPU, the display 194, the application processor, and the like.

The terminal device 100 may implement an audio function such as music playing or recording by using the audio module 170, the speaker 170A, the receiver 170B, the microphone 170C, the headset jack 170D, the application processor, and the like.

The external memory interface 120 may be configured to connect to an external memory card, for example, a micro SD card, to extend a storage capability of the terminal device 100.

The internal memory 121 may be configured to store computer executable program code. The executable program code includes instructions.

The button 190 includes a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. The touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 is compatible with different types of SIM cards. The SIM card interface 195 is also compatible with an external storage card. The terminal device 100 interacts with a network by using the SIM card, to implement functions such as calling and data communication. In some embodiments, the terminal device 100 uses an eSIM, namely, an embedded SIM card. The eSIM card may be embedded in the terminal device 100, and cannot be separated from the terminal device 100.

It can be understood that the structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

Figure 6:
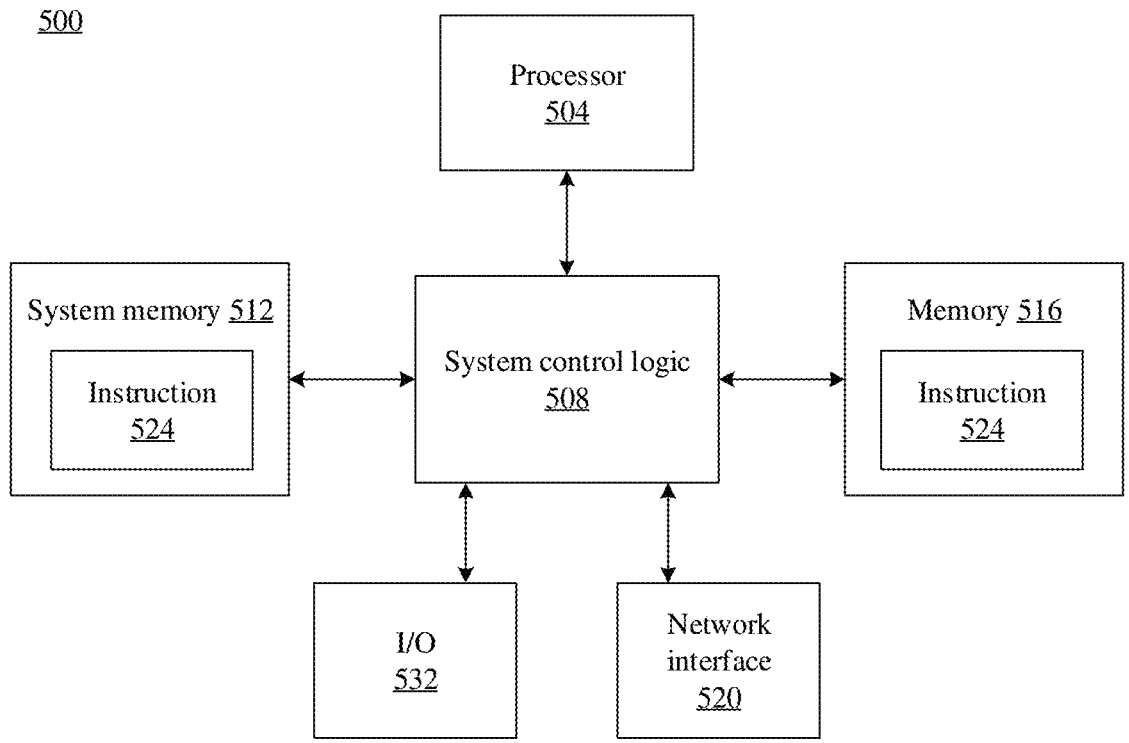
FIG. 6 is a schematic diagram of an example computing system according to an embodiment of this application.

The following describes an example computing system 500 according to some embodiments of this application with reference to FIG. 6. In various embodiments, the system 500 may be or may include a part of the terminal device 100. For example, the computing system 500 may be or may include a part of the computer 100b. In various embodiments, the system 500 may have more or fewer components and/or different architectures.

In an embodiment, the system 500 may include one or more processors 504, system control logic 508 connected to at least one of the processors 504, system memory 512 connected to the system control logic 508, a memory 516 (for example, a non-volatile memory (NVM)) connected to the system control logic 508, and a network interface 520 connected to the system control logic 508.

The processor 504 may include one or more single-core or multi-core processors. The processor 504 may include any combination of a general-purpose processor and a dedicated processor (for example, a graphics processing unit, an application processor, or a baseband processor). In some cases, the processor 504 may be configured to perform various operations performed by the mobile phone 100a or the computer 100b described with reference to FIG. 2A to FIG. 4B.

In an embodiment, the system control logic 508 may include any suitable interface controller to provide any suitable interface for at least one of the processors 504 and/or any suitable device or component that communicates with the system control logic 508.

In an embodiment, the system control logic 508 may include one or more memory controllers to provide an interface connected to the system memory 512. The system memory 512 may be configured to: load and store data and/or instructions. For example, for the system 500, in an embodiment, the system memory 512 may include any suitable volatile memory, for example, a suitable random access memory (RAM) or a dynamic random access memory (DRAM).

The memory 516 may include one or more tangible non-transitory computer-readable media that are configured to store data and/or instructions. For example, the memory 516 may include any suitable non-volatile memory and/or any suitable non-volatile storage device, for example, a flash memory, a hard disk drive (HDD), a solid-state drive (SSD), and a compact disk (CD) drive, and/or a digital versatile disk (DVD) drive.

The memory 516 may include some storage resources on an apparatus on which the system 500 is installed, or may be accessed by a device, but is not necessarily a part of the device. For example, the memory 516 may be accessed through a network by using the network interface 520.

In particular, the system memory 512 and the memory 516 each may include a temporary copy and a permanent copy of an instruction 524. The instruction 524 may include an instruction that leads, when the instruction is executed by at least one of the processors 504, the system 500 to implement the method described above. In various embodiments, the instruction 524, hardware, firmware, and/or software components of the system may additionally/alternatively be deployed in the system control logic 508, the network interface 520, and/or the processor 504.

The network interface 520 may include a transceiver, and is configured to provide a radio interface for the system 500 to communicate with any other suitable device (for example, a front-end module and an antenna) through one or more networks. In various embodiments, the network interface 520 may be integrated with another component of the system 500. For example, the network interface may include a processor of the processor 504, a memory of the system memory 512, a memory of the memory 516, and/or a firmware device (not shown) having an instruction. The instruction is an instruction that leads, when executed by at least one of the processors 504, the system 500 to implement the method executed by the mobile phone 100a or the computer 100b in FIG. 2A and FIG. 2B.

The network interface 520 may further include any suitable hardware and/or firmware to provide a multiple-input multiple-output radio interface. For example, in an embodiment, the network interface 520 may be a network adapter, a wireless network adapter, a telephone modem, and/or a wireless modem.

In an embodiment, at least one of the processors 504 may be packaged together with logic of one or more controllers used for the system control logic 508. In an embodiment, at least one of the processors 504 may be packaged together with logic of one or more controllers used for the system control logic 508, to form a system in package (SiP). In an embodiment, at least one of the processors 504 may be integrated with logic of one or more controllers used for the system control logic 508. In an embodiment, at least one of the processors 504 may be integrated with logic of one or more controllers used for the system control logic 508, to form a system-on-a-chip (SoC).

The system 500 may further include an input/output (I/O) device 532. The I/O device 532 may include a user interface designed to enable a user to interact with the system 500, a peripheral component interface designed to enable a peripheral component to also interact with the system 500, a sensor designed to determine environmental conditions and/or location information associated with the system 500, and/or the like.

In various embodiments, the user interface may include but is not limited to a display (for example, a liquid crystal display or a touchscreen display), a speaker, a microphone, one or more cameras (for example, a still image camera and/or a video camera), a flashlight/flash (for example, a light-emitting diode flash), and a keyboard.

In various embodiments, the peripheral component interface may include but is not limited to a non-volatile memory port, an audio jack, and a charging port.

In various embodiments, the sensor may include but is not limited to a gyroscope sensor, an accelerometer, a proximity sensor, an ambient light sensor, and a positioning unit. The positioning unit may alternatively be a part of the network interface 520, or may interact with the network interface 520, to communicate with a component (for example, a global positioning system (GPS) satellite) of a positioning network.

Figure 7:
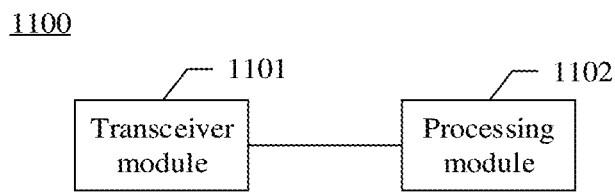
FIG. 7 is a schematic diagram of a terminal device according to an embodiment of this application.

FIG. 7 shows another terminal device 1100 according to an embodiment of this application. For example, the device 1100 includes a transceiver module 1101 and a processing module 1102.

According to some embodiments of this application, the terminal device 1100 may perform various operations performed by the mobile phone 100a or the computer 100b in the content sharing method shown in FIG. 2A and FIG. 2B. For example, according to some embodiments of this application, a content sharing apparatus may be provided. The content sharing apparatus may be implemented in the mobile phone 100a or the computer 100b. The content sharing apparatus may include the transceiver module 1101 and the processing module 1102. According to some embodiments of this application, the content sharing apparatus may be configured to perform various operations performed by the mobile phone 100a or the computer 100b described with reference to FIG. 2A and FIG. 2B.

For example, when the content sharing apparatus is implemented in the mobile phone 100a, the transceiver module 1101 may be configured to perform operations S1 and S4, receive a signal sent in S7, and perform operations S11 to S14, S16, and the like, and the processing module 1102 may be configured to perform operations S2, S3, S8 to S10, S15, and the like.

According to some embodiments of this application, when the content sharing apparatus is implemented in the computer 100b, the transceiver module 1101 may be configured to receive signals sent in operations S1, S4, and S11, and perform operations S7, S12 to S14, S16, and the like. The processing module 1102 may be configured to perform operations S5, S6, and the like.

Figure 8:
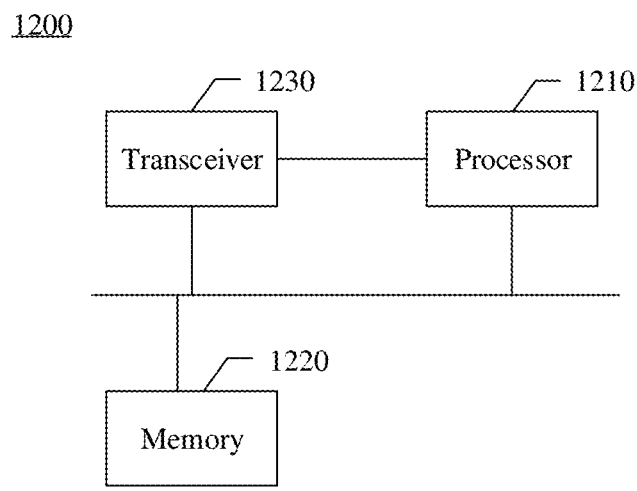
FIG. 8 is a schematic diagram of a terminal device according to another embodiment of this application.

FIG. 8 shows another terminal device 1200 according to an embodiment of this application. The terminal device 1200 includes at least one processor 1210, a memory 1220, and a transceiver 1230. The processor 1210 is coupled to the memory 1220 and the transceiver 1230. Coupling in this embodiment of this application is direct coupling, indirect coupling, or communication connection between apparatuses, units, or modules, may be implemented in electrical, mechanical, or another form, and is used for information exchange between the apparatuses, the units, or the modules. A connection medium between the transceiver 1230, the processor 1210, and the memory 1220 is not limited in this embodiment of this application. For example, according to some embodiments of this application, the memory 1220, the processor 1210, and the transceiver 1230 may be connected by using a bus. The bus may be classified into an address bus, a data bus, a control bus, and the like.

The memory 1220 may be configured to store program instructions. The transceiver 1230 may be configured to receive or send data. The processor 1210 may be configured to invoke the program instructions stored in the memory 1220, so that the device 1200 performs an operation performed by the mobile phone 100a or the computer 100b in FIG. 2A and FIG. 2B.

According to some embodiments of this application, the processor 1210 may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in embodiments of this application. The general-purpose processor may be a microprocessor, any conventional processor, or the like. The operations in the methods disclosed with reference to embodiments of this application may be directly performed and completed by a hardware processor, or may be performed and completed by a combination of hardware in the processor and a software module.

According to some embodiments of this application, the memory 1220 may be a non-volatile memory or a volatile memory. The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

Embodiments disclosed in this application may be implemented in hardware, software, firmware, or a combination of these implementation methods. Embodiments of this application may be implemented as a computer program or program code executed in a programmable system. The programmable system may include at least one processor, a storage system (including a volatile memory, a non-volatile memory, and/or a storage element), at least one input device, and at least one output device.

The program code may be used to input instructions, to perform functions described in this application and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented by using a high-level programming language or an object-oriented programming language, to communicate with the processing system. The program code may also be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. The disclosed embodiments may alternatively be implemented in a form of instructions or programs carried or stored on one or more transient or non-transient machine-readable (for example, computer-readable) storage media, and the instructions or the programs may be read and executed by one or more processors or the like. When the instructions or the programs are run by a machine, the machine may perform the foregoing various methods. For example, the instructions may be distributed through a network or another computer-readable medium. Therefore, the machine-readable medium may include but is not limited to any mechanism used to store or transmit information in a machine (for example, computer)-readable form, for example, a floppy disk, a compact disc, a compact disc read-only memory (CD-ROM), a magnetic disc, a read-only memory (ROM), a random access memory (RAM), an erasable programmable read-only memory (EPROM), an electronically erasable programmable read-only memory (EEPROM), a magnetic card, an optical card, a flash memory used to transmit network information by using an electrical signal, an optical signal, an acoustic signal, or another form of signal (for example, a carrier, an infrared signal, or a digital signal), or a tangible machine-readable memory. Therefore, the machine-readable medium includes any form of machine-readable medium that is suitable for storing or transmitting electronic instructions or machine (for example, computer)-readable information.

Therefore, embodiments of this application further include a non-transient tangible machine-readable medium. The medium includes instructions or design data, for example, a hardware description language (HDL), and defines a structure, a circuit, an apparatus, a processor, and/or a system feature described in this specification. These embodiments are also referred to as program products.

According to some embodiments of this application, to implement functions in the method provided in embodiments of this application, a terminal device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint condition of the technical solutions.

Aspects of the illustrative embodiments will be described using terms commonly used by a person skilled in the art to communicate the essence of their work to another person skilled in the art. However, it is apparent to a person skilled in the art that some alternative embodiments may be implemented using some features described below. For the purpose of explanation, specific numbers and configurations are used in descriptions for a more thorough understanding of illustrative embodiments. However, it is apparent to a person skilled in the art that alternative embodiments may be implemented without specific details. In some other cases, some well-known features are omitted or simplified herein to avoid obscuring illustrative embodiments of this application.

It should be understood that although terms such as "first" and "second" may be used herein to describe various features, these features should not be limited by these terms. These terms are merely used for distinction, and shall not be understood as an indication or implication of relative importance. For example, without departing from the scope of example embodiments, a first feature may be referred to as a second feature, and similarly the second feature may be referred to as the first feature.

Furthermore, various operations will be described as a plurality of separate operations in a manner that is most conducive to understanding illustrative embodiments. However, a described sequence should not be construed as implying that these operations need to depend on the described sequence. Many of these operations may be performed in parallel, concurrently, or simultaneously. In addition, the sequence of the operations may be further rearranged. The processing may be terminated when the described operations are completed, but may also have additional operations not included in the figures. The processing may correspond to a method, a function, a procedure, a subroutine, a subprogram, or the like.

References to "an embodiment", "embodiments", "an illustrative embodiment", and the like in the specification indicate that the described embodiment may include a specific feature, structure, or property, but each embodiment may or may not necessarily include the specific feature, structure, or property. In addition, these phrases are not necessarily intended for a same embodiment. In addition, when specific features are described with reference to specific embodiments, knowledge of a person skilled in the art can affect combination of these features with other embodiments, regardless of whether these embodiments are explicitly described.

In the accompanying drawings, some structure or method features may be shown in a specific arrangement and/or order. However, it should be understood that such a specific arrangement and/or order is not required. In some embodiments, these features may be described in a manner and/or order different from that shown in the descriptive accompanying drawings. In addition, structure or method features included in a specific accompanying drawing do not mean that all embodiments need to include such features. In some embodiments, these features may not be included, or these features may be combined with other features.

Unless otherwise stated, terms "have", "comprise", and "include" are synonymous. A phrase "A/B" indicates "A or B". The phrase "A and/or B" means "(A), (B), or (A and B)".

As used herein, the term "module" may refer to being a part thereof, or include a memory (a shared memory, a dedicated memory, or a group memory) for running one or more software or firmware programs, an application-specific integrated circuit (ASIC), an electronic circuit and/or a processor (a shared processor, a dedicated processor, or a group processor), a combined logic circuit, and/or another suitable component that provides the function.

Embodiments of this application are described above in detail with reference to the accompanying drawings. However, use of the technical solutions of this application is not limited to various applications mentioned in embodiments of this application, and various structures and variations may be easily implemented with reference to the technical solutions of this application, to achieve various beneficial effects mentioned in this specification. Without departing from the purpose of this application, any variation made within the scope of knowledge possessed by a person of ordinary skill in the art shall fall within the scope of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
   determining, by a first device, that a distance between the first device and a second device is less than a distance threshold;
   prompting, by the first device in response to the determining, that content transmission between the first device and the second device is performable, wherein the prompting further prompts a user on the first device when a gesture operation may be started;
   detecting, by the first device after the prompting, the gesture operation of the user on the first device;
   determining, by the first device, transmission content and a transmission direction of the transmission content between the first device and the second device based on the gesture operation, the determining the transmission direction comprising:
      after the detecting the gesture operation, determining, by the first device, whether the first device is to receive the transmission content or to send the transmission content based on the gesture operation;
   sending, by the first device to the second device, information indicating the transmission direction and the transmission content; and
   after the sending the information, receiving, by the first device, the transmission content from the second device or sending the transmission content to the second device based on the transmission direction.

2. The method according to claim 1, wherein the determining, by the first device, the transmission content and the transmission direction of the transmission content between the first device and the second device based on the gesture operation comprises:
   determining, by the first device based on a detected first gesture operation, first transmission content and that a first transmission direction of the first transmission content is from the first device to the second device.

3. The method according to claim 1, wherein the determining, by the first device, the transmission content and the transmission direction of the transmission content between the first device and the second device based on the gesture operation comprises:
   determining, by the first device based on a detected second gesture operation, first transmission content and that a first transmission direction of the first transmission content is from the second device to the first device.

4. The method according to claim 1, wherein the gesture operation is a movement manner in which the user holds the first device.

5. The method according to claim 4, wherein the movement manner in which the user holds the first device is determined by detecting a change in acceleration of the first device.

6. The method according to claim 1, wherein the gesture operation is a touch operation of the user on a touchscreen of the first device.

7. The method according to claim 1, wherein the determining, by the first device, that the distance between the first device and the second device is less than the distance threshold comprises:
monitoring, by the first device, a change in magnetic induction signal strength of the first device, and when the change in the magnetic induction signal strength exceeds a preset strength change threshold, determining, by the first device, that the distance between the first device and the second device is less than the distance threshold.

8. The method according to claim 7, further comprising:
determining, by the first device, the distance between the first device and the second device through at least one of Bluetooth distance measurement, millimeter-wave distance measurement, or ultrasonic distance measurement.

9. The method according to claim 8, wherein determining, by the first device, the distance between the first device and the second device through the Bluetooth distance measurement comprises:
sending, by the first device, a first Bluetooth broadcast signal;
receiving, by the first device from the second device, a second Bluetooth broadcast signal and information related to a second distance, wherein the second Bluetooth broadcast signal is received by the first device in response to sending the first Bluetooth broadcast signal, the information related to the second distance represents the second distance that is between the first device and the second device and that is calculated by the second device based on the first Bluetooth broadcast signal;
obtaining, by the first device based on the second Bluetooth broadcast signal, a first distance that is between the first device and the second device and that is calculated by the first device based on signal strength of the second Bluetooth broadcast signal; and
determining a larger one of the first distance and the second distance as the distance between the first device and the second device.

10. A device comprising:
a non-transitory memory storing instructions; and
at least one processor, configured to execute the instructions in the non-transitory memory to cause the device to perform operations comprising:
determining that a distance between the device and a second device is less than a distance threshold;
prompting, in response to the determining, that content transmission between the device and the second device is performable, wherein the prompting further prompts a user on the device when a gesture operation may be started;
detecting, after the prompting, the gesture operation of the user on the device;
determining transmission content and a transmission direction of the transmission content between the device and the second device based on the gesture operation, the determining the transmission direction comprising:
after the detecting the gesture operation, determining whether the device is to receive the transmission content or to send the transmission content based on the gesture operation;
sending, to the second device, information indicating the transmission direction and the transmission content; and
after the sending the information, receiving the transmission content from the second device or sending the transmission content to the second device based on the transmission direction.

11. The device according to claim 10, wherein the determining the transmission content and the transmission direction of the transmission content between the device and the second device based on the gesture operation comprises:
determining, based on a detected first gesture operation, first transmission content and that a first transmission direction of the first transmission content is from the device to the second device.

12. The device according to claim 10, wherein the determining the transmission content and the transmission direction of the transmission content between the device and the second device based on the gesture operation comprises:
determining, based on a detected second gesture operation, first transmission content and that a first transmission direction of the first transmission content is from the second device to the device.

13. The device according to claim 10, wherein the gesture operation is a movement manner in which the user holds the device.

14. The device according to claim 13, wherein the movement manner in which the user holds the device is determined by detecting a change in acceleration of the device.

15. The device according to claim 10, wherein the gesture operation is a touch operation of the user on a touchscreen of the device.

16. The device according to claim 10, wherein the determining that the distance between the device and the second device is less than the distance threshold comprises:
monitoring a change in magnetic induction signal strength of the device, and when the change in the magnetic induction signal strength exceeds a preset strength change threshold, determining that the distance between the device and the second device is less than the distance threshold.

17. The device according to claim 16, wherein the operations further comprise: determining the distance between the device and the second device through at least one of Bluetooth distance measurement, millimeter-wave distance measurement, or ultrasonic distance measurement.

18. The device according to claim 17, wherein determining the distance between the device and the second device through the Bluetooth distance measurement comprises:
sending a first Bluetooth broadcast signal;
receiving, from the second device, a second Bluetooth broadcast signal and information related to a second distance, wherein the second Bluetooth broadcast signal is received by the device in response to sending the first Bluetooth broadcast signal, the information related to the second distance represents the second distance that is between the device and the second device and that is calculated by the second device based on the first Bluetooth broadcast signal;

obtaining, based on the second Bluetooth broadcast signal, a first distance that is between the device and the second device and that is calculated by the device based on signal strength of the second Bluetooth broadcast signal; and determining a larger one of the first distance and the second distance as the distance between the device and the second device.

19. A non-transitory machine-readable storage medium storing instructions, the instructions, when run by a machine, causing the machine to perform operations comprising:

determining that a distance between the machine and a second device is less than a distance threshold;

prompting, in response to the determining, that content transmission between the machine and the second device is performable, wherein the prompting further prompts a user on the machine when a gesture operation may be started;

detecting, after the prompting, the gesture operation of the user on the machine;

determining transmission content and a transmission direction of the transmission content between the machine and the second device based on the gesture operation, the determining the transmission direction comprising:

after the detecting the gesture operation, determining whether the machine is to receive the transmission content or to send the transmission content based on the gesture operation;

sending, to the second device, information indicating the transmission direction and the transmission content; and after the sending the information, receiving the transmission content from the second device or sending the transmission content to the second device based on the transmission direction.

20. The non-transitory machine-readable storage medium according to claim 19, wherein the determining the transmission content and the transmission direction of the transmission content between the machine and the second device based on the gesture operation comprises:

determining based on a detected first gesture operation, first transmission content and that a first transmission direction of the first transmission content is from the machine to the second device.

\* \* \* \* \*